United States Patent [19]

Nakazawa et al.

[11] Patent Number: 5,916,982

[45] Date of Patent: *Jun. 29, 1999

[54] PROCESS FOR THE PRODUCTION OF POLYOLEFINS

[75] Inventors: Osamu Nakazawa; Akira Sano, both of Kawasaki; Kazuo Matsuura, Kanagawa-ken, all of Japan

[73] Assignee: Nippon Oil Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/722,516

[22] Filed: Sep. 27, 1996

[30] Foreign Application Priority Data

Sep. 29, 1995 [JP] Japan ..................... 7-276475
Sep. 29, 1995 [JP] Japan ..................... 7-276834

[51] Int. Cl.$^6$ ..................... C08F 4/64
[52] U.S. Cl. ..................... 526/97; 526/96; 526/114; 526/115; 526/117; 526/128; 526/153; 526/160; 526/943; 526/348.6; 502/113; 502/152
[58] Field of Search ..................... 526/96, 97, 114, 526/115, 116, 117, 118, 119, 128, 153, 160, 943

[56] References Cited

U.S. PATENT DOCUMENTS

| 4,659,685 | 4/1987 | Coleman, III et al. | |
|---|---|---|---|
| 4,935,474 | 6/1990 | Ewen et al. | 526/114 |
| 4,937,299 | 6/1990 | Ewen et al. | 526/119 |
| 4,939,217 | 7/1990 | Stricklen . | |
| 5,064,797 | 11/1991 | Stricklen | 502/111 |
| 5,124,418 | 6/1992 | Welborn, Jr. | 526/114 |
| 5,145,818 | 9/1992 | Tsutsui et al. | 502/113 |
| 5,183,867 | 2/1993 | Welborn, Jr. | 526/114 |
| 5,350,817 | 9/1994 | Winter et al. | 526/119 |
| 5,374,700 | 12/1994 | Tsutsui et al. | 526/348.3 |
| 5,473,028 | 12/1995 | Nowlin et al. | 526/114 |
| 5,525,678 | 6/1996 | Mink et al. | 252/246 |
| 5,539,066 | 7/1996 | Winter et al. | 526/119 |
| 5,648,428 | 7/1997 | Reddy et al. | 526/116 |

FOREIGN PATENT DOCUMENTS

| 0 128 045 A1 | 12/1984 | European Pat. Off. . |
| 0 339 571 A1 | 11/1989 | European Pat. Off. . |
| WO 87/02991 | 5/1987 | WIPO . |

OTHER PUBLICATIONS

Christoph Denger et al., "Simultaneous Oligomerization And Polymerization Of Ethylene," Makromolekulare Chemie, Rapid Communications, vol. 12, No. 12, pp. 697–701, Dec. 1991.

*Primary Examiner*—David W. Wu
*Attorney, Agent, or Firm*—Panitch Schwarze Jacobs & Nadel, P.C.

[57] ABSTRACT

A process for the production of polyolefins is provided which comprises polymerizing or copolymerizing olefins in the presence of a catalyst composition which includes a catalyst component (I) resulting from mutual contact of sub-components (A) and (B), and a catalyst component (II). Sub-component (A) is of the formula $$R^1_p Me^1 X^1_{4-p} \text{ and/or } R^1_2 Me^1 X^{1'}$$

and sub-component (B) is a modified organoaluminum compound having Al—O—Al bonds. Catalyst component (II) is an admixture of sub-component (C), which is a transition metal elemental compound of Groups VII–VIII, and one or more of triethylaluminum, triisobutylaluminum, diethyl zinc, n-butyllithium, and butylmagnesiumchloride. The catalyst components (I) and/or (II) are contacted with a carrier during or after the preparation of the components (I) and/or (II).

9 Claims, No Drawings

PROCESS FOR THE PRODUCTION OF POLYOLEFINS

BACKGROUND OF THE INVENTION

This invention relates to a process for the production of polyolefins, more particularly to such a process which is capable of providing polymers with increased molecular weights.

Enhancement of the polymer molecular weight in the manufacture of polyolefins, particularly ethylene polymers or ethylene/α-olefin copolymers, is an important factor leading to the availability of broadened and versatile product grades. It has been a conventional method to enhance the polymer molecular weight by carrying out the polymerization reaction totally without or with the use of reduced amounts of a chain transfer agent such as hydrogen, or by controlling the polymerization temperature or pressure.

SUMMARY OF THE INVENTION

Whereas the present invention provides a polymerization process, quite distinct from the conventional counterpart, for affording a polymer with enhanced molecular weight.

According to one aspect of the invention, there is provided a process for the production of polyolefins which comprises polymerizing or copolymerizing olefins in the presence at least of:

a catalyst component (I) resulting from mutual contact of sub-components (A) and (B), said sub-component (A) being of the formula

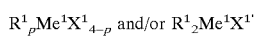

wherein $Me^1$ is a transition metal of the IVa Group in the Periodic Table, $R^1$ is either of cyclopentadienyl, substituted cyclopentadienyl, indenyl, substituted indenyl, fluorenyl and substituted fluorenyl groups which may be bonded through a $C_2$–$C_{18}$ hydrocarbon group and/or a silylene group, $X^1$ is a halogen atom, a hydrogen atom or a $C_1$–$C_{24}$ hydrocarbon group, p is an interger of $1 \leq p \leq 4$, and $X^{1'}$ is a $C_1$–$C_{20}$ alkylidene group, and said sub-component (B) being a modified organoaluminum compound having Al—O—Al bonds; and a catalyst component (II) selected from the group of sub-components (C) and (E), said sub-component (C) being a transition metal elemental compound belonging to the IV–VIII Groups in the Periodic Table and selected specifically from the group consisting of oxides, halides, carbonates, acetates, alkoxides, acetylacetonates, metallocenes, hydrogen complexes, alkyl complexes, phosphine complexes, cyano complexes, pyridyl complexes and carbonyl complexes of said transition metal elemental compounds or a compound resulting from mutual contact of said transition metal elemental compound and a compound (D) of the formula

wherein R' and R'' each are a $C_1$–$C_{24}$ hydrocarbon group, X' is a halogen or hydrogen atom, Me' is an element of the I–III Groups in the Periodic Table, z is a valence of Me', m and n are $0<m \leq z$ and $0 \leq n \leq z$, respectively and $0<m+n \leq z$; and said sub-component (E) being a transition metal of the IV–VIII Groups in the Periodic Table.

According to another aspect of the invention, there is provided a process for the production of polyolefins which comprises polymerizing or copolymerizing olefins in the presence of a catalyst composition which comprises contacting an inorganic compound carrier and/or a particulate polymer carrier with at least either one of said catalyst components (I) and (II) during or after the preparation thereof.

The present invention seeks to provide a process for the production of polyolefins having increased molecular weights and a relatively wide molecular weight distribution and also a high yield of olefinic polymers or copolymers having a relatively narrow composition distribution. The invention further seeks to provide polyolefins having a satisfactory granular quality.

According to the process of the invention, it is made possible to increase and control the molecular weight of polyolefins by means distinct from and advantageous over the prior art.

The invention will be described below in full detail.

The inventive process is directed to the production of polyolefins in which olefins are polymerized or copolymerized in the presence of polymerization catalysts (I) and (II).

DETAILED DESCRIPTION OF THE INVENTION

The various components of the catalyst composition according to the invention are identified as follows:

Component (A) . . . a compound of the formula

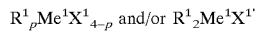

Component (B) . . . a modified organoaluminum compound having Al—O—Al bonds

Component (C) . . . a transition metal elemental compound of the Groups IV–VIII in the Periodic Table Component (D) . . . a compound of the formula

Component (E) . . . a transition metal of the Groups IV–VIII in the Periodic Table Component (F) . . . an inorganic compound carrier and/or a particulate polymer carrier Catalyst (I)

The catalyst (I) of the invention is made available from mutual contact at least between a compound of the formula $R^1_p Me^1 X^1_{4-p}$ and/or $R^1_2 Me^1 X^{1'}$ (hereinafter referred to as Component (A)) and an Al—O—Al bond-containing modified organoaluminum compound (hereinafter referred to as Component (B)).

The Component (A) is a compound of the formula

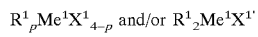

wherein $Me^1$ is a transition metal of the IVa Group in the Periodic Table, $R^1$ is either of cyclopentadienyl, substituted cyclopentadienyl, indenyl, substituted indenyl, fluorenyl and substituted fluorenyl groups which may be bonded through a $C_2$–$C_{18}$ hydrocarbon group and/or a silylene group, $X^1$ is a halogen atom, a hydrogen atom or a $C_1$–$C_{24}$ hydrocarbon group, p is an integer of $1 \leq p \leq 4$, and $X^{1'}$ is a $C_1$–$C_{20}$ alkylidene group. The substituting group is a $C_1$–$C_{18}$ hydrocarbon group including alkyl groups such as methyl, ethyl, propyl, isopropyl, butyl, t-butyl, pentyl, hexyl and octyl groups, or a $C_1$–$C_{24}$, preferably a $C_1$–$C_{12}$ hydrocarbon group including alkenyl groups such as vinyl and allyl groups, aryl groups such as phenyl, tolyl and xylyl groups and aralkyl groups such as benzyl, phenethyl, styryl and neophyl.

$R^1$ in the above formula may be bonded together via a $C_2$–$C_{18}$ hydrocarbon group and/or a sylylene group, in which instance $R^1$ may be divalent with one hydrogen atom in $R^1$ being a free valence. The $C_2$–$C_{18}$ hydrocarbon groups include an alkylene group such as methylene, ethylene and isopropylene; an alkylene group having aryl-substituted group such as diphenylmethylene, methylphenylmethylene and ditolylmethylene; an alkylene group having alkenyl-substituted group such as divinylethylene and diallylmethylene; an alkylene group having aralkyl-substituted group such as benzyl group, phenethyl group, styryl group and neophyl group and an alkylidene group such as methylidene, ethylidene, propylidene and isopropylidene. The sylylene groups include an alkyl-substituted group such as dimethylsilylene and diethylsilylene; an aryl-substituted group such as diphenylsilylene, methylphenylsilylene and ditolylsilylene; an alkenyl-substituted group such as divinylsilylene and diallylsilylene; and an aralkyl-substituted group such as benzyl group, phenethyl group, styryl group and neophyl group.

$Me^1$ is a IVa Group metal such as zirconium, hafnium and titanium, of which zirconium is preferred. $X^1$ is an alkyl group such as methyl group, ethyl group, propyl group, isopropyl group, butyl group, t-butyl group, cyclobutyl group, isopentyl group, pentyl group, neopentyl group, cyclopentyl group, isohexyl group, cyclohexyl group, hexyl group and octyl group; an alkenyl group such as vinyl group and allyl group; an alkoxy group such as methoxy group, ethoxy group, propoxy group and butoxy group; an aryl group such as phenyl group, tolyl group, xylyl group and mesityl group; an aryloxy group such as phenoxy group and tolyloxy group and an aralkyl group such as benzyl group, phenethyl group, styryl group, benzhydryl group, trityl group, phenylbutyl group, phenylpropyl group and neophyl group. $X^{1'}$ is a $C_1$–$C_{20}$ alkylidene group including methylidyne, ethylidene and propylidyne. p is conforming to $1 \leq p \leq 4$. If $1 \leq p \leq 2$, $X^1$ may be the same or different.

Specific examples of the $R^1{}_p Me^1 X^1{}_{4-p}$ and/or $R^1{}_2 Me^1 X^{1'}$ compounds include cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, 1,2,4-trimethylcyclopentadienyltrimethyltitanium, 1,2,3,4-tetramethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitaniumdichloride, cyclopentadienylethyltitaniumdichloride, pentamethylcyclopentadienylmethyltitaniumdichloride, pentamethylcyclopentadienylethyltitaniumdichloride, cyclopentadienyldimethyltitaniummonochloride, cyclopentadienyldiethyltitaniummonochloride, cyclopentadienyltitaniumtrimethoxide, cyclopentadienyltitaniumtriethoxide, cyclopentadienyltitaniumtripropoxide, cyclopentadienyltitaniumtriphenoxide, pentamethylcyclopentadienyltitaniumtrimethoxide, pentamethylcyclopentadienyltitaniumtriethoxide, pentamethylcyclopentadienyltitaniumtripropoxide, pentamethylcyclopentadienyltitaniumtributoxide, pentamethylcyclopentadienyltitaniumtriphenoxide, cyclopentadienyltitaniumtrichloride, pentamethylcyclopentadienyltitaniumtrichloride, cyclopentadienylmethoxytitaniumdichloride, cyclopentadienyldimethoxytitaniumchloride, pentamethylcyclopentadienylmethoxytitaniumdichloride, cyclopentadienyltribenzyltitanium, pentamethylcyclopentadienylmethyldiethoxytitanium, indenyltitaniumtrichloride, indenyltitaniumtrimethoxide, indenyltitaniumtriethoxide, indenyltrimethyltitanium, indenyltribenzyltitanium, cyclopentadienyltrimethylzirconium, cyclopentadienyltriethylzirconium, cyclopentadienyltripropylzirconium, cyclopentadienyltributylzirconium, methylcyclopentadienyltrimethylzirconium, 1,2-dimethylcyclopentadienyltrimethylzirconium, 1,2,4-trimethylcyclopentadienyltrimethylzirconium, 1,2,3,4-tetramethylcyclopentadienyltrimethylzirconium, pentamethylcyclopentadienyltrimethylzirconium, pentamethylcyclopentadienyltriethylzirconium, pentamethylcyclopentadienyltripropylzirconium, pentamethylcyclopentadienyltributylzirconium, cyclopentadienylmethylzirconiumdichloride, cyclopentadienylethylzirconiumdichloride, pentamethylcyclopentadienylmethylzirconiumdichloride, pentamethylcyclopentadienylethylzirconiumdichloride, cyclopentadienyldimethylzirconiummonochloride, cyclopentadienyldiethylzirconiummonochloride, cyclopentadienylzirconiumtrimethoxide, cyclopentadienylzirconiumtriethoxide, cyclopentadienylzirconiumtripropoxide, cyclopentadienylzirconiumtriphenoxide, pentamethylcyclopentadienylzirconiumtrimethoxide, pentamethylcyclopentadienylzirconiumtriethoxide, pentamethylcyclopentadienylzirconiumtripropoxide, pentamethylcyclopentadienylzirconiumtributoxide, pentamethylcyclopentadienylzirconiumtriphenoxide, cyclopentadienylzirconiumtrichloride, pentamethylcyclopentadienylzirconiumtrichloride, cyclopentadienylmethoxyzirconiumdichloride, cyclopentadienyldimethoxyzirconiumchloride, pentamethylcyclopentadienylmethoxyzirconiumdichloride, cyclopentadienyltribenzylzirconium, pentamethylcyclopentadienylmethyldiethoxyzirconium, indenylzirconiumtrichloride, indenylzirconiumtrimethoxide, indenylzirconiumtriethoxide, indenyltrimethylzirconium, indenyltribenzylzirconium, cyclopentadienyltrimethylhafnium, cyclopentadienyltriethylhafnium, cyclopentadienyltripropylhafnium, cyclopentadienyltributylhafnium, methylcyclopentadienyltrimethylhafnium, 1,2-dimethylcyclopentadienyltrimethylhafnium, 1,2,4-trimethylcyclopentadienyltrimethylhafnium, 1,2,3,4-tetramethylcyclopentadienyltrimethylhafnium, pentamethylcyclopentadienyltrimethylhafnium, pentamethylcyclopentadienyltriethylhafnium, pentamethylcyclopentadienyltripropylhafnium, pentamethylcyclopentadienyltributylhafnium, cyclopentadienylmethylhafniumdichloride, cyclopentadienylethylhafniumdichloride, pentamethylcyclopentadienylmethylhafniumdichloride pentamethylcyclopentadienylethylhafniumdichloride, cyclopentadienyldimethylhafniummonochloride, cyclopentadienyldiethylhafniummonochloride, cyclopentadienylhafniumtrimethoxide, cyclopentadienylhafniumtriethoxide, cyclopentadienylhafniumtripropoxide, cyclopentadienylhafniuntriphenoxide, pentamethylcyclopentadienylhafniumtrimethoxide, pentamethylcyclopentadienylhafniumtriethoxide, pentamethylcyclopentadienylhafniumtripropoxide, pentamethylcyclopentadienylhafniumtributoxide, pentamethylcyclopentadienylhafniumtriphenoxide, pentamethylcyclopentadienylhafniumtrichloride, cyclopentadienylhafniumtrichloride, pentamethylcyclopentadienylhafniumtrichloride, cyclopentadienylmethoxyhafniumdichloride, cyclopentadienyldimethoxyhafniumchloride, pentamethylcyclopentadienylmethoxyhafniumdichloride, cyclopentadienyltribenzylhafnium, pentamethylcyclopentadienylmethyldiethoxyhafnium, indenylhafniumtrichloride, indenylhafniumtrimethoxide, indenylhafniumtriethoxide, indenyltrimethylhafnium, indenyltribenzylhafnium, bis(cyclopentadienyl)dichlorotitanium, bis(cyclopentadienyl)methylchlorotitanium, bis(cyclopentadienyl)dimethyltitanium, bis(cyclopentadienyl)ethoxychlorotitanium, bis(cyclopentadienyl)propoxychlorotitanium, bis(cyclopentadienyl)phenoxychlorotitanium, bis(cyclopentadienyl)propylchlorotitanium, bis(cyclopentadienyl)diphenyltitanium, bis(cyclopentadienyl)ditolyltitanium, bis(cyclopentadienyl)titaniumdibenzyl, bis(cyclopentadienyl)titaniummonochloromonohydride, bis(methylcyclopentadienyl)dimethyltitanium, tetracyclopentadienyltitanium, bis(indenyl)dichlorotitanium, bis(indenyl)dimethyltitanium, ethylenebis(indenyl)titaniumdichloride, ethylenebis(tetrahydroindenyl)titaniumdimethyl, tetraneopentyltitanium, tetraneophyltitanium, tetrabenzyltitanium, bis(cyclopentadienyl)dichlorozirconium, bis(cyclopentadienyl)methylchlorozirconium, bis(cyclopentadienyl)dimethylzirconium, bis(indenyl)dimethylzirconium, bis(indenyl)dichlorozirconium, ethylenebis(indenyl)dichlorozirconium, ethylenebis(tetrahydroindenyl)dichlorozirconium, bis(methylcyclopentadienyl)dimethylzirconium, bis(cyclopentadienyl)zirconiummonochloromonohydride, bis(cyclopentadienyl)zirconiumdibenzyl, tetracyclopentadienylzirconium, tetrabenzylzirconium, bis(cyclopentadienyl)ethoxychlorozirconium, bis(cyclopentadienyl)propoxychlorozirconium, bis(cyclopentadienyl)phenoxychlorozirconium, bis(cyclopentadienyl)propylchlorozirconium, bis(cyclopentadienyl)diphenylzirconium, bis(cyclopentadienyl)ditolylzirconium, bis(cyclopentadienyl)monomethylmonohydridezirconium, bis(cyclopentadienyl)monoethylmonochloridezirconium, bis(cyclopentadienyl)monophenylmonochloridezirconium, tetraneopentylzirconium, tetraneophylzirconium, bisindenylzirconiumdiphenyl, bisindenylzirconiumdibenzyl, bisfluorenylzirconiumdiphenyl, bisfluorenylzirconiumdibenzyl, bispentamethylcyclopentadienylzirconiumdimethyl, bispentamethylcyclopentadienylzirconiumdiphenyl, bispentamethylcyclopentadienylzirconiumdichloride, bispentamethylcyclopentadienylzirconiumdibenzyl, bis(cyclopentadienyl)dimethylhafnium, bis(cyclopentadienyl)dichlorohafnium, bis(cyclopentadienyl)methylchlorohafnium, bis(cyclopentadienyl)ethylchlorohafnium, bis(cyclopentadienyl)propylchlorohafnium, bis(cyclopentadienyl)phenylchlorohafnium, bis(cyclopentadienyl)diphenylhafnium, bis(cyclopentadienyl)ditolylhafnium, bis(cyclopentadienyl)monochloromonohydridehafnium, bis(cyclopentadienyl)monomethylmonohydridehafnium, bis(cyclopentadienyl)dibenzylhafnium, ethylenebis(indenyl)dichlorohafnium, ethylenebis(tetrahydroindenyl)dichlorohafnium, tetraneopentylhafnium, tetraneophylhafnium, silylenebiscyclopentadienyltitaniumdichloride, silylenebiscyclopentadienyltitaniumdimethyl, silylenebiscyclopentadienyltitaniumdiethyl, silylenebiscyclopentadienyltitaniumdiphenyl, silylenebismethylcyclopentadienyltitaniumdichloride, silylenebismethylcyclopentadienyltitaniumdimethyl, silylenebismethylcyclopentadienyltitaniumdiethyl, silylenebismethylcyclopentadienyltitaniumdiphenyl, dimethylsilylenebiscyclopentadienyltitaniumdichloride, dimethylsilylenebiscyclopentadienyltitaniumdibromide, dimethylsilylenebiscyclopentadienyltitaniumdimethyl, dimethylsilylenebiscyclopentadienyltitaniumdiethyl, dimethylsilylenebiscyclopentadienyltitaniumdiphenyl, dimethylsilylenebismethylcyclopentadienyltitaniumdichloride, dimethylsilylenebismethylcyclopentadienyltitaniumdibromide, dimethylsilylenebismethylcyclopentadienyltitaniumdimethyl, dimethylsilylenebismethylcyclopentadienyltitaniumdiethyl, dimethylsilylenebismethylcyclopentadienyltitaniumdiphenyl, phenylmethylsilylenebiscyclopentadienyltitaniumdichloride, phenylmethylsilylenebiscyclopentadienyltitaniumdibromide, phenylmethylsilylenebiscyclopentadienyltitaniumdimethyl, phenylmethylsilylenebiscyclopentadienyltitaniumdiethyl, phenylmethylsilylenebiscyclopentadienyltitaniumdiphenyl, phenylmethylsilylenebismethylcyclopentadienyltitaniumdichloride, phenylmethylsilylenebismethylcyclopentadienyltitanium dibromide, phenylmethylsilylene bismethylcyclopentadienyltitaniumdimethyl, phenylmethylsilylenebismethylcyclopentadienyltitaniumdiethyl, phenylmethylsilylenebismethylcyclopentadienyltitanium diphenyl, diphenylsilylenebiscyclopentadienyltitaniumdichloride, diphenylsilylenebiscyclopentadienyltitaniumdibromide, diphenylsilylenebiscyclopentadienyltitaniumdimethyl, diphenylsilylenebiscyclopentadienyltitaniumdiethyl, diphenylsilylenebiscyclopentadienyltitaniumdiphenyl, diphenylsilylenebismethylcyclopentadienyltitaniumdichloride, diphenylsilylenebismethylcyclopentadienyltitaniumdibromide, diphenylsilylenebismethylcyclopentadienyltitaniumdimethyl, diphenylsilylenebismethylcyclopentadienyltitaniumdiethyl, diphenylsilylenebismethylcyclopentadienyltitaniumdiphenyl, disilylenebiscyclopentadienyltitaniumdichloride, disilylenebiscyclopentadienyltitaniumdibromide, disilylenebiscyclopentadienyltitaniumdimethyl, disilylenebiscyclopentadienyltitaniumdiethyl, disilylenebiscyclopentadienyltitaniumdiphenyl, disilylenebismethylcyclopentadienyltitaniumdichloride, disilylenebismethylcyclopentadienyltitaniumdibromide, disilylenebismethylcyclopentadienyltitaniumdimethyl, disilylenebismethylcyclopentadienyltitaniumdiethyl, disilylenebismethylcyclopentadienyltitaniumdiphenyl, tetramethylsilylenebiscyclopentadienyltitaniumdichloride, tetramethylsilylenebiscyclopentadienyltitaniumdibromide, tetramethylsilylenebiscyclopentadienyltitaniumdimethyl, tetramethylsilylenebiscyclopentadienyltitaniumdiethyl, tetramethylsilylenebiscyclopentadienyltitaniumdiphenyl, tetramethylsilylenebismethylcyclopentadienyltitaniumdichloride, tetramethylsilylenebismethylcyclopentadienyltitaniumdibromide, tetramethylsilylenebismethylcyclopentadienyltitaniumdimethyl, tetramethylsilylenebiomethylcyclopentadienyltitaniumdiethyl, tetramethylsilylenebismethylcyclopentadienyltitaniumdiphenyl, silylenebiscyclopentadienylzirconiumdichloride, silylenebiscyclopentadienylzirconiumdibromide, silylenebiscyclopentadienylzirconiumdimethyl, silylenebiscyclopentadienylzirconiumdiethyl, silylenebiscyclopentadienylzirconiumdiphenyl, silylenebismethylcyclopentadienylzirconiumdichloride, silylenebismethylcyclopentadienylzirconiumdibromide, silylenebismethylcyclopentadienylzirconiumdimethyl silylenebismethylcyclopentadienylzirconiumdiethyl, silylenebismethylcyclopentadienylzirconiumdiphenyl, dimethylsilylenebiscyclopentadienylzirconiumdichloride, dimethylsilylenebiscyclopentadienylzirconiumdibromide, dimethylsilylenebiscyclopentadienylzirconiumdimethyl, dimethylsilylenebiscyclopentadienylzirconiumdiethyl, dimethylsilylenebiscyclopentadienylzirconiumdiphenyl, dimethylsilylenebismethylcyclopentadienylzirconiumdichloride, dimethylsilylenebismethylcyclopentadienylzirconiumdi bromide, dimethylsilylenebismethylcyclopentadienylzirconiumdi methyl, dimethylsilylenebismethylcyclopentadienylzirconiumdi ethyl, dimethylsilylenebismethylcyclopentadienylzirconiumdiphenyl, phenylmethylsilylenebiscyclopentadienylzirconium dichloride, phenylmethylsilylenebiscyclopentadienylzirconiumdibromide, phenylmethylsilylenebiscyclopentadienylzirconiumdimethyl, phenylmethylsilylenebiscyclopentadienylzirconiumdiethyl, phenylmethylsilylenebiscyclopentadienylzirconiumdiphenyl, phenylmethylsilylenebismethylcyclopentadienylzirconium dichloride, phenylmethylsilylenebismethylcyclopentadienylzirconiumdibromide, phenylmethylsilylenebismethylcyclopentadienylzirconiumdimethyl, phenylmethylsilylenebismethylcyclopentadienylzirconium diethyl, phenylmethylsilylenebismethylcyclopentadienylzirconiumdiphenyl, diphenylsilylenebiscyclopentadienyl zirconium dichloride, diphenylsilylenebiscyclopentadienylzirconiumdibromide, diphenylsilylene biscyclopentadienylzirconiumdimethyl, diphenylsilylenebiscyclopentadienylzirconiumdiethyl, diphenylsilylenebiscyclopentadienylzirconiumdiphenyl, diphenylsilylenebismethylcyclopentadienylzirconiumdichloride, diphenylsilylenebismethylcyclopentadienylzirconium dibromide, diphenylsilylenebismethylcyclopentadienylzirconiumdimethyl, diphenylsilylenebismethylcyclopentadienylzirconiumdiethyl, diphenylsilylenebismethylcyclopentadienylzirconiumdi phenyl, disilylenebiscyclopentadienylzirconiumdichloride, disilylenebiscyclopentadienylzirconiumdibromide, disilylenebiscyclopentadienylzirconiumdimethyl, disilylenebiscyclopentadienylzirconiumdiethyl, disilylenebiscyclopentadienylzirconiumdiphenyl, disilylenebismethylcyclopentadienylzirconiumdichloride, disilylenebismethylcyclopentadienylzirconiumdibromide, disilylenebismethylcyclopentadienylzirconiumdimethyl, disilylenebismethylcyclopentadienylzirconiumdiethyl, disilylenebismethylcyclopentadienylzirconiumdiphenyl, tetramethylsilylenebiscyclopentadienylzirconiumdichloride, tetramethylsilylenebiscyclopentadienylzirconiumdibromide, tetramethylsilylenebiscyclopentadienylzirconiumdimethyl, tetramethylsilylenebiscyclopentadienylzirconiumdiethyl, tetramethylsilylenebiscyclopentadienylzirconiumdiphenyl, tetramethylsilylenebismethylcyclopentadienylzirconium dichloride, tetramethylsilylenebismethylcyclopentadienylzirconiumdibromide, tetramethylsilylenebismethylcyclopentadienylzirconiumdimethyl, tetramethylsilylenebismethylcyclopentadienylzirconium diethyl, tetramethylsilylenebismethylcyclopentadienylzirconiumdiphenyl, silylenebiscyclopentadienylhafnium dichloride, silylenebiscyclopentadienylhafniumdibromide, silylenebiscyclopentadienylhafniumdimethyl, silylenebiscyclopentadienylhafniumdiethyl, silylenebiscyclopentadienylhafniumdiphenyl, silylenebismethylcyclopentadienylhafniumdichloride, silylenebismethylcyclopentadienylhafniumdibromide, silylenebismethylcyclopentadienylhafniumdimethyl, silylenebismethylcyclopentadienylhafniumdiethyl, silylenebismethylcyclopentadienylhafniumdiphenyl, dimethylsilylenebiscyclopentadienylhafniumdichloride, dimethylsilylenebiscyclopentadienylhafniumdibromide, dimethylsilylenebiscyclopentadienylhafniumdimethyl, dimethylsilylenebiscyclopentadienylhafniumdiethyl, dimethylsilylenebiscyclopentadienylhafniumdiphenyl, dimethylsilylenebismethylcyclopentadienylhafniumdichloride, dimethylsilylenebismethylcyclopentadienylhafnium dibromide, dimethylsilylenebismethylcyclopentadienylhafniumdimethyl, dimethylsilylenebismethylcyclopentadienylhafniumdiethyl, dimethylsilylenebismethylcyclopentadienylhafnium diphenyl, phenylmethylsilylenebiscyclopentadienylhafniumdi chloride, phenylmethylsilylenebiscyclopentadienylhafniumdi bromide, phenylmethylsilylenebiscyclopentadienylhafniumdimethyl, phenylmethylsilylenebiscyclopentadienylhafniumdiethyl, phenylmethylsilylenebiscyclopentadienylhafniumdiphenyl, phenylmethylsilylenebismethylcyclopentadienylhafniumdi chloride, phenylmethylsilylenebismethylcyclopentadienyl hafniumdibromide, phenylmethylsilylenebismethylcyclopentadienylhafniumdimethyl, phenylmethylsilylenebismethylcyclopentadienylhafniumdiethyl, phenylmethylsilylenebismethylcyclopentadienylhafnium diphenyl, diphenylsilylenebiscyclopentadienylhafniumdichloride, diphenylsilylenebiscyclopentadienylhafniumdibromide, diphenylsilylenebiscyclopentadienylhafniumdimethyl, diphenylsilylenebiscyclopentadienylhafniumdiethyl, diphenylsilylenebiscyclopentadienylhafniumdiphenyl, diphenylsilylenebismethylcyclopentadienylhafniumdi chloride, diphenylsilylenebismethylcyclopentadienyl hafniumdibromide, diphenylsilylenebismethylcyclopentadienylhafniumdimethyl, diphenylsilylenebismethylcyclopentadienylhafniumdiethyl, diphenylsilylenebismethylcyclopentadienylhafniumdiphenyl, disilylenebiscyclopentadienylhafniumdichloride, disilylenebiscyclopentadienylhafniumdibromide, disilylenebiscyclopentadienylhafniumdimethyl, disilylenebiscyclopentadienylhafniumdiethyl, disilylenebiscyclopentadienylhafniumdiphenyl, disilylenebismethylcyclopentadienylhafniumdichloride, disilylenebismethylcyclopentadienylhafniumdibromide, disilylenebismethylcyclopentadienylhafniumdimethyl, disilylenebismethylcyclopentadienylhafniumdiethyl, disilylenebismethylcyclopentadienylhafniumdiphenyl, tetramethylsilylenebiscyclopentadienylhafniumdichloride, tetramethylsilylenebiscyclopentadienylhafniumdibromide, tetramethylsilylenebiscyclopentadienylhafniumdimethyl, tetramethylsilylenebiscyclopentadienylhafniumdiethyl, tetramethylsilylenebiscyclopentadienylhafniumdiphenyl, tetramethylsilylenebismethylcyclopentadienylhafnium dichloride, tetramethylsilylenebismethylcyclopentadienyl hafniumdibromide, tetramethyl silylenebismethylcyclopentadienylhafniumdimethyl, tetramethylsilylene bismethylcyclopentadienylhafniumdiethyl, tetramethylsilylenebismethylcyclopentadienylhafniumdi phenyl, isopropylidenebiscyclopentadienyltitaniumdichloride, isopropylidenebiscyclopentadienyltitaniumdimethyl, isopropylidenebiscyclopentadienyltitaniumdiphenyl, isopropylidenebiscyclopentadienyltitaniumdibenzyl, isopropylidenebiscyclopentadienyltitaniumdihydride, isopropylidenebiscyclopentadienyltitaniumhydridechloride, isopropylidenebiscyclopentadienylzirconiumdichloride, isopropylidenebiscyclopentadienylzirconiumdibromide, isopropylidenebiscyclopentadienylzirconiumdimethyl, isopropylidenebiscyclopentadienylzirconiumdiphenyl, isopropylidenebiscyclopentadienylzirconiumdibenzyl, isopropylidenebiscyclopentadienylzirconiumdineophyl, isopropylidenebiscyclopentadienylzirconiumditolyl, isopropylidenebiscyclopentadienylzirconiumdihydride, isopropylidenebiscyclopentadienylzirconiumhydridemethyl, isopropylidenebiscyclopentadienylzirconiumhydride chloride, isopropylidenebiscyclopentadienylzirconiumhydridebenzyl, isopropylidenebiscyclopentadienylhafnium dichloride, isopropylidenebiscyclopentadienylhafnium dimethyl, isopropylidenebiscyclopentadienylhafnium dibenzyl, isopropylidenebiscyclopentadienylhafnium dihydride, isopropylidenebiscyclopentadienylhafniumhydridechloride, diphenylmethylene(cyclopentadienyl)indenyltitaniumdichloride, diphenylmethylene(cyclopentadienyl)fluorenyltitaniumdichloride, diphenylmethylene(indenyl)fluorenyltitaniumdichloride, isopropylidene(cyclopentadienyl)indenyltitaniumdichloride, isopropylidene(cyclopentadienyl)fluorenyltitaniumdichloride, isopropylidene(indenyl)fluorenyltitaniumdichloride, ethylene(cyclopentadienyl)indenyltitaniumdichloride, ethylene(cyclopentadienyl)fluorenyltitaniumdichloride, dimethylsilylene(cyclopentadienyl)indenyltitaniumdichloride, dimethylsilylene(cyclopentadienyl)fluorenyltitaniumdichloride, dimethylsilylene(indenyl)fluorenyltitaniumdichloride, diphenylsilylene(cyclopentadienyl)indenyltitaniumdichloride, diphenylsilylene(cyclopentadienyl)fluorenyltitaniumdichloride, diphenylsilylene(indenyl)fluorenyltitaniumdichloride, diphenylmethylene(cyclopentadienyl)indenyltitaniumdimethyl, diphenylmethylene(cyclopentadienyl)fluorenyltitaniumdimethyl, diphenylmethylene(indenyl)fluorenyltitaniumdimethyl, isopropylidene(cyclopentadienyl)indenyltitaniumdimethyl, isopropylidene(cyclopentadienyl)fluorenyltitaniumdimethyl, isopropylidene(indenyl)fluorenyltitaniumdimethyl, ethylene(cyclopentadienyl)indenyltitaniumdimethyl, ethylene(cyclopentadienyl)fluorenyltitaniumdimethyl, dimethylsilylene(cyclopentadienyl)indenyltitaniumdimethyl, dimethylsilylene(cyclopentadienyl)fluorenyltitaniumdimethyl, dimethylsilylene(indenyl)fluorenyltitaniumdimethyl, diphenylsilylene(cyclopentadienyl)indenyltitaniumdimethyl, diphenylsilylene(cyclopentadienyl)fluorenyltitaniumdimethyl, diphenylsilylene(indenyl)fluorenyltitaniumdimethyl, diphenylmethylene(cyclopentadienyl)indenylzirconiumdichloride, diphenylmethylene(cyclopentadienyl)fluorenylzirconiumdichloride, diphenylmethylene(indenyl)fluorenylzirconiumdichloride, isopropylidene(cyclopentadienyl)indenylzirconiumdichloride, isopropylidene(cyclopentadienyl)fluorenylzirconiumdichloride, isopropylidene(indenyl)fluorenylzirconiumdichloride, ethylene(cyclopentadienyl)indenylzirconiumdichloride, ethylene cyclopentadienyl)fluorenylzirconiumdichloride, dimethylsilylene(cyclopentadienyl)indenylzirconiumdichloride, dimethylsilylene(cyclopentadienyl)fluorenylzirconiumdichloride, dimethylsilylene(indenyl)fluorenylzirconiumdichloride, diphenylsilylene(cyclopentadienyl)indenylzirconiumdichloride, diphenylsilylene(cyclopentadienyl)fluorenylzirconiumdichloride, diphenylesilylene(indenyl)fluorenylzirconiumdichloride, diphenylmethylene(cyclopentadienyl)indenylzirconiumdimethyl, diphenylmethylene(cyclopentadienyl)fluorenylzirconiumdimethyl, diphenylmethylene(indenyl)fluorenylzirconiumdimethyl, isopropylidene(cyclopentadienyl)indenylzirconiumdimethyl, isopropylidene(cyclopentadienyl)fluorenylzirconiumdimethyl, isopropylidene(indenyl)fluorenylzirconiumdimethyl, ethylene(cyclopentadienyl)indenylzirconiumdimethyl, ethylene(cyclopentadienyl)fluorenylzirconiumdimethyl, dimethylsilylene(cyclopentadienyl)indenylzirconiumdimethyl, dimethylsilylene(cyclopentadienyl)fluorenylzirconiumdimethyl, dimethylsilylene(indenyl)fluorenylzirconiumdimethyl, diphenylsilylene(cyclopentadienyl)indenylzirconiumdimethyl, diphenylsilylene(cyclopentadienyl)fluorenylzirconiumdimethyl, diphenylsilylene(indenyl)fluorenylzirconiumdimethyl, diphenylmethylene(cyclopentadienyl)indenylhafniumdichloride, diphenylmethylene(cyclopentadienyl)fluorenylhafniumdichloride, diphenylmethylene(indenyl)fluorenylhafniumdichloride, isopropylidene(cyclopentadienyl)indenylhafniumdichloride, isopropylidene(cyclopentadienyl)fluorenylhafniumdichloride, isopropylidene(indenyl)fluorenylhafniumdichloride, ethylene(cyclopentadienyl)indenylhafniumdichloride, ethylene(cyclopentadienyl)fluorenylhafniumdichloride, dimethylsilylene(cyclopentadienyl)indenylhafniumdichloride, dimethylsilylene(cyclopentadienyl)fluorenylhafniumdichloride, dimethylsilylene(indenyl)fluorenylhafniumdichloride, diphenylsilylene(cyclopentadienyl)indenylhafniumdichloride, diphenylsilylene(cyclopentadienyl)fluorenylhafniumdichloride, diphenylsilylene(indenyl)fluorenylhafniumdichloride, diphenylmethylene(cyclopentadienyl)indenylhafniumdimethyl, diphenylmethylene(cyclopentadienyl)fluorenylhafniumdimethyl, diphenylmethylene(indenyl)fluorenylhafniumdimethyl, isopropylidene(cyclopentadienyl)indenylhafniumdimethyl, isopropylidene(cyclopentadienyl)fluorenylhafniumdimethyl, isopropylidene(indenyl)fluorenylhafniumdimethyl, ethylene(cyclopentadienyl)indenylhafniumdimethyl, ethylene(cyclopentadienyl)fluorenylhafniumdimethyl, dimethylsilylene(cyclopentadienyl)indenylhafniumdimethyl, dimethylsilylene(cyclopentadienyl)fluorenylhafniumdimethyl, dimethylsilylene(indenyl)fluorenylhafniumdimethyl, diphenylsilylene(cyclopentadienyl)indenylhafniumdimethyl, diphenylsilylene(cyclopentadienyl)fluorenylhafniumdimethyl, diphenylsilylene(indenyl)fluorenylhafniumdimethyl, diphenylmethylene(methylcyclopentadienyl)indenylzirconiumdichloride, diphenylmethylene(methylcyclopentadienyl)fluorenylzirconiumdichloride, diphenylmethylene(methylindenyl)fluorenylzirconiumdichloride, isopropylidene(methylcyclopentadienyl)indenylzirconiumdichloride, isopropylidene(methylcyclopentadienyl)fluorenylzirconiumdichloride, isopropylidene(methylindenyl)fluorenylzirconiumdichloride, ethylene(methylcyclopentadienyl)indenylzirconiumdichloride, ethylene(methylcyclopentadienyl)fluorenylzirconiumdichloride, dimethylsilylene(methylcyclopentadienyl)indenylzirconiumdichloride, dimethylsilylene(methylcyclopentadienyl)fluorenylzirconiumdichloride, dimethylsilylene(methylindenyl)fluorenylzirconiumdichloride, diphenylsilylene(methylcyclopentadienyl)indenylzirconiumdichloride, diphenylsilylene(methylcyclopentadienyl)fluorenylzirconiumdichloride, diphenylsilylene(methylindenyl)fluorenylzirconiumdichloride, diphenylmethylene(methylcyclopentadienyl)indenylzirconiumdimethyl, diphenylmethylene(methylcyclopentadienyl)fluorenylzirconiumdimethyl, diphenylmethylene(methylindenyl)fluorenylzirconiumdimethyl, isopropylidene(methylcyclopentadienyl)indenylzirconiumdimethyl, isopropylidene(methylcyclopentadienyl)fluorenylzirconiumdimethyl, isopropylidene(methylindenyl)fluorenylzirconiumdimethyl, ethylene(methylcyclopentadienyl)indenylzirconiumdimethyl, ethylene(methylcyclopentadienyl)fluorenylzirconiumdimethyl, dimethylsilylene(methylcyclopentadienyl)indenylzirconiumdimethyl, dimethylsilylene(methylcyclopentadienyl)fluorenylzirconiumdimethyl, dimethylsilylene(methylindenyl)fluorenylzirconiumdimethyl, diphenylsilylene(methylcyclopentadienyl)indenylzirconiumdimethyl, diphenylsilylene(methylcyclopentadienyl)fluorenylzirconiumdimethyl, diphenylsilylene(methylindenyl)fluorenylzirconiumdimethyl, diphenylmethylene(dimethylcyclopentadienyl)indenylzirconiumdichloride, diphenylmethylene(dimethylcyclopentadienyl)fluorenylzirconiumdichloride, diphenylmethylene(dimethylindenyl)fluorenylzirconiumdichloride, isopropylidene(dimethylcyclopentadienyl)indenylzirconiumdichloride, isopropylidene(dimethylcyclopentadienyl)fluorenylzirconiumdichloride, isopropylidene(dimethylindenyl)fluorenylzirconiumdichloride, ethylene(dimethylcyclopentadienyl)indenylzirconiumdichloride, ethylene(dimethylcyclopentadienyl)fluorenylzirconiumdichloride, dimethylsilylene(dimethylcyclopentadienyl)indenylzirconiumdichloride, dimethylsilylene(dimethylcyclopentadienyl)fluorenylzirconiumdichloride, dimethylsilylene(dimethylindenyl)fluorenylzirconiumdichloride, diphenylsilylene(dimethylcyclopentadienyl)indenylzirconiumdichloride, diphenylsilylene(dimethylcyclopentadienyl)fluorenylzirconiumdichloride, diphenylsilylene(dimethylindenyl)fluorenylzirconiumdichloride, diphenylmethylene(dimethylcyclopentadienyl)indenylzirconiumdimethyl, diphenylmethylene(dimethylcyclopentadienyl)fluorenylzirconiumdimethyl, diphenylmethylene(dimethylindenyl)fluorenylzirconiumdimethyl, isopropylidene(dimethylcyclopentadienyl)indenylzirconiumdimethyl, isopropylidene(dimethylcyclopentadienyl)fluorenylzirconiumdimethyl, ethylene(dimethylcyclopentadienyl)indenylzirconiumdimethyl, ethylene(dimethylcyclopentadienyl)fluorenylzirconiumdimethyl, dimethylsilylene(dimethylcyclopentadienyl)indenylzirconiumdimethyl, dimethylsilylene(dimethylcyclopentadienyl)fluorenylzirconiumdimethyl, dimethylsilylene(dimethylindenyl)fluorenylzirconiumdimethyl, diphenylsilylene(dimethylcyclopentadienyl)indenylzirconiumdimethyl, diphenylsilylene(dimethylcyclopentadienyl)fluorenylzirconiumdimethyl, diphenylsilylene(dimethylindenyl)fluorenylzirconiumdimethyl, bisfluorenyltitaniumdichloride, bisfluorenyltitaniumdimethyl, bisfluorenyltitaniumdihydride, bisfluorenylzirconiumdichloride, bisfluorenylzirconiumdibromide, bisfluorenylzirconiumdimethyl, bisfluorenylzirconiumdihydride, bisfluorenylzirconiumhydridemethyl, bisfluorenylzirconiumhydridechloride, bisfluorenylzirconiumhydridebenzyl, bisfluorenylhafniumdichloride, bisfluorenylhafniumdimethyl, bisfluorenylhafniumdihydride, bis(cyclopentadienyl)methylidenetitanium, bis(methylcyclopentadienyl)methylidenetitanium, bis(indenyl)methylidenetitanium, ethylenebisindenylmethylidenetitanium, dimethylsilylenebiscyclopentadienylmethylidenetitanium, bis(cyclopentadienyl)propylidenetitanium, bis(methylcyclopentadienyl)propylidenetitanium, bis(indenyl)propylidenetitanium, ethylenebisindenylpropylidenetitanium, dimethylsilylenebiscyclopentadienylpropylidenetitanium, bis(cyclopentadienyl)methylidenezirconium, bis(methylcyclopentadienyl)methylidenezirconium, bis(indenyl)methylidenezirconium, ethylenebisindenylmethylidenezirconium, dimethylsilylenebiscyclopentadienylmethylidenezirconium, bis(cyclopentadienyl)propylidenezirconium, bis(methylcyclopentadienyl)propylidenezirconium, bis(indenyl)propylidenezirconium, ethylenebisindenylpropylidenezirconium, dimethylsilylenebiscyclopentadienylpropylidenezirconium, bis(cyclopentadienyl)methylidenehafnium, bis(methylcyclopentadienyl)methylidenehafnium, bis(indenyl)methylidenehafnium, ethylenebisindenylmethylidenehafnium, dimethylsilylenebiscyclopentadienylmethylidenehafnium, bis(cyclopentadienyl)propylidenehafnium, bis(methylcyclopentadienyl)propylidenehafnium, bis(indenyl)propylidenehafnium, ethylenebisindenylpropylidenehafnium and dimethylsilylenebiscyclopentadienylpropylidenehafnium. These may be used in combination. Particularly preferred are bisindenylzirconiumdimethyl, bisindenylzirconiumdiphenyl, bisindenylzirconiumdichloride, bisindenylzirconiumdibenzyl, bisfluorenylzirconiumdimethyl, bisfluorenylzirconiumdiphenyl, bisfluorenylzirconiumdichloride, bisfluorenylzirconiumdibenzyl, biscyclopentadienylzirconiumdimethyl, biscyclopentadienylzirconiumdiphenyl, biscyclopentadienylzirconiumdichloride, biscyclopentadienylzirconiumdibenzyl, bispentamethylcyclopentadienylzirconiumdimethyl, bispentamethylcyclopentadienylzirconiumdiphenyl, bispentamethylcyclopentadienylzirconiumdichloride and bispentamethylcyclopentadienylzirconiumdibenzyl.

The modified organoaluminum compound (B) results from the reaction of an organoaluminum compound with water, and it has in its molecule an Al—O—Al bond numbering from 1 to 100, preferably from 1 to 50. The reaction is effected usually in the presence of an inert hydrocarbon, typically an aliphatic hydrocarbon such as pentane, hexane, heptane and the like, an alicyclic hydrocarbon such as cyclohexane or methylcyclohexane or an aromatic hydrocarbon such as benzene, toluene, xylene and the like. Particularly preferred are the aliphatic and aromatic hydrocarbons.

Suitable organoaluminum compounds are those of the formula $$R_nAlX_{3-n}$$

where R is a hydrocarbon group such as an alkyl, alkenyl, aryl and aralkyl group of 1 to 18, preferably 1 to 12 carbon atoms; X is a halogen or hydrogen atom; and n is an integer of $1 \leq n \leq 3$. Trialkylaluminums are preferred in which the alkyl group is a methyl, ethyl, propyl, isopropyl, butyl, isobutyl, pentyl, hexyl, octyl, decyl or dodecyl group, among which the methyl group is particularly preferred.

The mol ratio of water to organoaluminum compound is in the range of 0.25:1 to 1.2:1, preferably 0.5:1 to 1:1. Reaction conditions may be at from −70 to 100° C., preferably −20 to 20° C., and for 5 minutes to 24 hours, preferably 10 minutes to 5 hours. There may be used a water of crystallization contained in a hydrate such as copper sulfate hydrate, aluminum sulfate hydrate or the like. Alternatively, a supply of water may be sought from such materials which can produce water in the reaction system. It has been found that methylaluminoxane, a reaction product of an alkylaluminum and water, is particularly suitable for use as the component (B). Any of the above modified organoaluminum compounds may be used in combination.

Catalyst (II)

The catalyst (II) of the invention falls in the category of hydrogenation catalysts and comprises either component (C) or component (E). Component (C) is a transition metal elemental compound belonging to the IV–VIII Groups in the Periodic Table and selected specifically from the group consisting of oxides, halides, carbonates, acetates, alkoxides, acetylacetonates, metallocenes, hydrogen complexes, alkyl complexes, phosphine complexes, cyano complexes, pyridyl complexes and carbonyl complexes of said transition metal elemental compound, or a compound resulting from mutual contact of said transition metal elemental compound and a compound, hereinafter referred to as Component (D), of the formula $$Me'R'_m(OR'')_nX'_{z-m-n}$$

wherein R' and R'' each are a $C_1$–$C_{24}$ hydrocarbon group, X' is a halogen or hydrogen atom, Me' is an element of the I–III Groups in the Periodic Table, z is a valence of Me', m and n are $0<m \leq z$ and $0 \leq n \leq z$, respectively and $0<m+n \leq z$.

The Component (C) may be a single compound, composite compounds of two or more of the Group IV–VIII transition metals, or complexes having two or more ligands such as alkoxy/carbonyl, phosphine/hydrogen and carbonyl/cyclopentadienyl complexes.

Components (C) eligible for use in the invention exemplarily include Cr(acetylacetonate)$_3$, MoO$_2$(acetyl acetonate)$_2$, Mn(acetylacetonate)$_3$, Mn(acetylacetonate)$_2$, Fe(acetylacetonate)$_3$, Co(acetylacetonate)$_3$, Ru(acetylacetonate)$_3$, VO(OC$_2$H$_5$)$_3$, VO(On-C$_4$H$_9$)$_3$, Co{(C$_6$H$_5$)$_3$P}$_2$Cl$_2$, Ni(acetylacetonate)$_2$, Ni{(n-C$_4$H$_9$)$_3$P}$_2$Cl$_2$, Pd{(n-C$_4$H$_9$)$_3$P}$_2$Cl$_2$, chlorotris(triphenylphosphine)rhodium, hydridecarbonyltris(triphenylphosphine)rhodium, rhodium acetate, ruthenium acetate, chlorohydridetris(triphenylphosphine)ruthenium, carboxylatohydridetris(triphenylphosphine)ruthenium, hydridecarbonyltris(triphenylphosphine)iridium, trihydridetris(triphenylphosphine)cobalt, chlorocarbonylbis(triphenylphosphine)iridium, pentacyanocobalt (II) complex, tricyanobipyridinecobalt (II) complex, bis(dimethylglyoximato)cobalt (II) complex, tertiary organophosphine-cobaltcarbonyl complex, allenetricarbonylchromium complex, bis(tricarbonylcyclopentadienylchromium)pentacarbonyliron complex, ruthenium oxide and metallocene compounds of the formula $$R_pMX_{4-p} \text{ and/or } R^2MX'$$

wherein M is a transition metal of Group IVa in the Periodic Table, R is a cyclopentadienyl, substituted cyclopentadienyl, indenyl, substituted indenyl, fluorenyl and substituted fluorenyl group which may be bonded through a $C_2$–$C_{18}$ hydrocarbon group and/or a silylene group, said substituted cyclopentadienyl, substituted indenyl and substituted fluorenyl groups each having at least one hydrogen atom directly bonded to their respective 5-member rings, X is a halogen or hydrogen atom and a $C_1$–$C_{24}$ hydrocarbon moiety, p is $1 \leq p \leq 4$, and X' is a $C_1$–$C_{20}$ alkylidyne group, such metallocene compounds typically including biscyclopentadienyltitaniumdichloride, biscyclopentadienyltitaniumdimethyl, biscyclopentadienyltitaniumdibenzyl, biscyclopentadienylzirconiumdichloride, biscyclopentadienylzirconiumdimethyl and biscyclopentadienylzirconiumdibenzyl, compounds of the formula $$M'(OR)_z$$

wherein M' is a transition metal element of the Groups IV–VIII in the Periodic Table, R is a $C_1$–$C_{24}$, preferably a $C_1$–$C_{12}$ alkyl group, and z is a valence of M', such compounds typically including Ti(Oi-C$_3$H$_7$)$_4$, Ti(Oi-C$_4$H$_9$)$_4$, Zr(Ot-C$_4$H$_9$)$_4$, Zr(On-C$_4$H$_9$)$_4$, Zr(Oi-C$_4$H$_9$)$_4$, Co(Oi-C$_3$H$_7$)$_3$, Co(On-C$_3$H$_7$)$_3$, Co(Oi-C$_4$H$_9$)$_3$, Co(Ot-C$_4$H$_9$)$_3$, Co(On-C$_4$H$_9$)$_3$ and Co(On-C$_8$H$_{17}$)$_3$. These compounds may be used in combination. Component (C) may be supported on an inorganic carrier such as silica, silica gel, alumina, diatomaceous earth, active carbon, barium sulfate, asbestos, pumice, calcium carbonate, carbon (strontiumcarbon carbonate) ceramics and stainless, or may be dissolved homogeneously in a solvent such as a saturated or unsaturated hydrocarbon, an aromatic hydrocarbon, ether, ester, alcohol amide, sulphoxide, acid and ketone.

Component (C) when supported on such a carrier is used usually in an amount of less than 5 millimols, preferably from 0.0001 to 5 millimols, more preferably from 0.001 to gram of the carrier.

Component (D) used in the invention is represented by the general formula Me'R'M(OR'')$_n$X'$_{z-m-n}$ of the definition already advanced. Me' in the formula is an element of Groups I–III in the Periodic Table, specifically is selected from the group consisting of lithium, sodium, potassium, magnesium, calcium, zinc and aluminum. Me' preferably embraces the Group III elements. R' and R" each are $C_1$–$C_{24}$, preferably $C_1$–$C_{12}$, more preferably $C_1$–$C_8$ hydrocarbon groups including an alkyl group such as methyl group, ethyl group, propyl group, isopropyl group, cyclopropyl group, butyl group, isobutyl group, t-butyl group, pentyl group, isopentyl group, neopentyl group, cyclopentyl group, hexyl group, isohexyl group, cyclohexyl group, heptyl group, octyl group, decyl group and dodecyl group; an alkenyl group such as vinyl group and allyl group; an aryl group such as phenyl group, tolyl group, xylyl group, mesityl group, indenyl group and naphthyl group and an aralkyl group such as benzyl group, phenethyl group, styryl group, benzhydryl group, trityl group, phenylbutyl group, phenylpropyl group and neophyl group. These groups may be branched. X' is a halogen atom such as fluorine, iodine, chlarine and bromine or a hydrogen atom. If X' is a hydrogen atom, Me' is a Group III element such as boron and aluminum. z is a valence of Me', m and n are $0 \leq m \leq z$, $o \leq n \leq z$ and $o < m + n \leq z$.

Specific examples of Component (D) include methyllithium, ethyllithium, propyllithium, isopropyllithium, butyllithium, t-butyllithium, pentyllithium, octyllithium, phenyllithium, benzyllithium, dimethylmagnesium, diethylmagnesium, di-n-propylmagnesium, diisopropylmagnesium, dibutylmagnesium, di-t-butylmagnesium, dipentylmagnesium, dioctylmagnesium, diphenylmagnesium, dibenzylmagnesium, methylmagnesiumchloride, ethylmagnesiumchloride, propylmagnesiumchloride, isopropylmagnesiumchloride, butylmagnesiumchloride, t-butylmagnesiumchloride, pentylmagnesiumchloride, octylmagnesiumchloride, phenylmagnesiumchloride, benzylmagnesiumchloride, methylmagnesiumbromide, methylmagnesiumiodide, ethylmagnesiumbromide, ethylmagnesiumiodide, propylmagnesiumbromide, propylmagnesiumiodide, isopropylmagnesiumbromide, isopropylmagnesiumiodide, butylmagnesiumbromide, butylmagnesiumiodide, t-butylmagnesiumbromide, t-butylmagnesiumiodide, pentylmagnesiumbromide, pentylmagnesiumiodide, octylmagnesiumbromide, octylmagnesiumiodide, phenylmagnesiumbromide, phenylmagnesiumiodide, benzylmagnesiumbromide, benzylmagnesiumiodide, dimethylzinc, diethylzinc, dipropylzinc, diisopropylzinc, di-n-butylzinc, di-t-butylzinc, dipentylzinc, dioctylzinc, diphenylzinc, dibenzylzinc, trimethylboron, triethylboron, tripropylboron, triisopropylboron, tributylboron,tri-t-butylboron, tripentylboron, trioctylboron, triphenylboron, tribenzylboron, trimethylaluminum, triethylaluminum, diethylaluminumchloride, diethylaluminumbromide, diethylaluminumfluoride, diethylaluminumiodide, ethylaluminumdichloride, ethylaluminumdibromide, ethylaluminumdifluoride, ethylaluminumdiiodide, tripropylaluminum, dipropylaluminunchloride, dipropylaluminumbromide, dipropylaluminumfluoride, dipropylaluminumiodide, propylaluminumdichloride, propylaluminumdibromide, propylaluminumdifluoride, propylaluminumdiiodide, triisopropylaluminum, diisopropylaluminumchloride, diisopropylaluminumbromide, diisopropylaluminumfluoride, diisopropylaluminumiodide, ethylaluminumsesquichloride, ethylaluminumsesquibromide, propylaluminumsesquichloride, propylaluminumsesquibromide, butylaluminumsesquichloride, butylaluminumsesquibromide, isopropylaluminumdichloride, isopropylaluminumdibromide, isopropylaluminumdifluoride, isopropylaluminumdiiodide, tributylaluminum, dibutylaluminumchloride, dibutylaluminumbromide, dibutylaluminumfluoride, dibutylaluminumiodide, butylaluminumdichloride, butylaluminumdibromide, butylaluminumdifluoride, butylaluminumdiiodide, tri-sec-butylaluminum, di-sec-butylaluminumchloride, di-sec-butylaluminumbromide, di-sec-butylalumninumfluoride, di-sec-butylaluminumiodide, sec-butylaluminumdichloride, sec-butylaluminumdibromide, sec-butylaluminumdifluoride, sec-butylaluminumdiiodide, tri-tert-butylaluminum, di-tert-butylaluminumchloride, di-tert-butylaluminumbromide, di-tert-butylaluminumfluoride, di-tert-butylaluminumiodide, tert-butylaluminumdichloride, tert-butylaluminumdibromide, tert-butylaluminumdifluoride, tert-butylaluminumdiiodide, triisobutylaluminum, diisobutylaluminumchloride, diisobutylaluminumbromide, diisobutylaluminumfluoride, diisobutylaluminumiodide, isobutylaluminumdichloride, isobutylaluminumdibromide, isobutylaluminumdifluoride, isobutylaluminumdiiodide, trihexylaluminum, dihexylaluminumchloride, dihexylaluminumbromide, dihexylaluminumfluoride, dihexylaluminumiodide, hexylaluminumdichloride, hexylaluminumdibromide, hexylaluminumdifluoride, hexylaluminumdiiodide, tripentylaluminum, dipentylaluminumchloride, dipentylaluminumbromide, dipentylaluminumfluoride, dipentylaluminumiodide, pentylaluminumdichloride, pentylaluminumdibromide, pentylaluminumdifluoride, pentylaluminumdiiodide, tridecylaluminum, methylaluminumdimethoxide, methylaluminumdiethoxide, methylaluminumdipropoxide, methylaluminumdibutoxide, dimethylaluminummethoxide, dimethylaluminumethoxide, dimethylaluminumpropoxide, dimethylaluminumbutoxide, ethylaluminumdimethoxide, ethylaluminumdiethoxide, ethylaluminumdipropoxide, ethylaluminumdibutoxide, diethylaluminummethoxide, diethylaluminumethoxide, diethylaluminumpropoxide, diethylaluminumbutoxide, propylaluminumdimethoxide, propylaluminumdiethoxide, propylaluminumdipropoxide, propylaluminumdibutoxide, dipropylaluminummethoxide, dipropylaluminumethoxide, dipropylaluminumpropoxide, dipropylaluminumbutoxide, butylaluminumdimethoxide, butylaluminumdiethoxide, butylaluminumdipropoxide, butylaluminumdibutoxide, dibutylaluminummethoxide, dibutylaluminumethoxide, dibutylaluminumpropoxide, dibutylaluminumbutoxide, dimethylaluminumhydride, diethylaluminumhydride, dipropylaluminumhydride, diisopropylaluminumhydride, dibutylaluminumhydride, diisobutylaluminumhydride, dihexylaluminumhydride, dicyclohexylaluminumhydride, methylaluminumdihydride, ethylaluminumdihydride, propylaluminumdihydride, isopropylaluminumdihydride, butylaluminumdihydride, isobutylaluminumdihydride, hexylaluminumdihydride and cyclohexylaluminumdihydride. These may be used in combination. Particularly preferred Components (D) are trimethylaluminum, triethylaluminum, diethylaluminumchloride, tripropylaluminum, triisopropylaluminum, tributylaluminum, tri-sec-butylaluminum, tri-tert-butylaluminum, triisobutylaluminum, trihexylaluminum, tripentylaluminum, diisobutylaluminumhydride, tridecylaluminum, diethylzinc, n-butyllithium and butylmagnesiumchloride.

More preferred are triethylaluminum, triisobutylaluminum, diethylzinc, n-butyllithium and butylmagnesiumchloride.

Component (E) used in the inventive catalyst (II) exemplarily embraces titanium, zirconium, hafnium, vanadium, niobium, tantalum, molybdenum, tungsten, manganese, technetium, rhenium, iron, ruthenium, osmium, cobalt, rhodium, iridium, nickel, palladium and platinum. These metals may be used singly and in any suitable form such as of powder, sheet honeycomb, rod and the like. They may be supported on an inorganic carrier such as of silica, silica gel, alumina, diatomaceous earth, active carbon, barium sulfate, asbestos, pumice, calcium carbonate, carbon (strontiumcarbon carbonate) ceramics and stainless, such carrier being powdery, sheet-like or honeycomb-shaped, the last-named being particularly preferred.

Component (E) further includes colloidal platinum, platinum black, platinized asbestos, platinum silica gel (carrier), colloidal palladium, palladium black, palladium silica gel (carrier), reduced nickel, nickel-diatomaceous earth (carrier), nickel pumice (carrier), Raney nickel, reduced cobalt, Raney cobalt, rhodium carbon (carrier), rhodium alumina (carrier), ruthenium carbon (carrier) and Raney nickel alumina (carrier).

Examples of the catalyst (II) suitable for use in the invention include colloidal platinum, platinum black, platinized asbestos, platinum silica gel (carrier), colloidal palladium, palladium black, palladium silica gel (carrier), reduced nickel, nickel-diatomaceous earth (carrier), nickel pumice (carrier), Raney nickel, reduced cobalt, Raney cobalt, rhodium carbon (carrier), rhodium alumina (carrier), ruthenium carbon (carrier), ruthenium oxide, biscyclopentadienyltitaniumdichloride-n-butyllithium, biscyclopentadienyltitaniumdichloride-diethylzinc, biscyclopentadienyltitaniumdichloride-diethylmagnesium, biscyclopentadienyltitaniumdichloride-ethylmagnesiumchloride, biscyclopentadienyltitaniumdichloride-triethyl aluminum, biscyclopentadienyltitaniumdichloride-triisobutylaluminum, biscyclopentadienyltitaniumdimethyl-n-butyllithium, biscyclopentadienyltitaniumdimethyl-diethylzinc, biscyclopentadienyltitaniumdimethyl-diethylmagnesium, biscyclopentadienyltitaniumdimethyl-ethylmagnesiumchloride, biscyclopentadienyltitaniumdimethyl-triethylaluminum, biscyclopentadienyltitaniumdimethyl-triisobutylaluminum, biscyclopentadienyltitaniumdibenzyl-n-butyllithium, biscyclopentadienyltitaniumdibenzyl-diethylzinc, biscyclopentadienyltitaniumdibenzyl-diethylmagnesium, biscyclopentadienyltitaniumdibenzyl-ethylmagnesiumchloride, biscyclopentadienyltitaniumdibenzyl-triethylaluminum, biscyclopentadienyltitaniumdibenzyl-triisobutylaluminum, biscyclopentadienylzirconiumdichloride-n-butyllithium, biscyclopentadienylzirconiumdichloride-diethylzinc, biscyclopentadienylzirconiumdichloride-diethylmagnesium, biscyclopentadienylzirconiumdichloride-ethylmagnesiumchloride, biscyclopentadienylzirconiumdichloride-triethyl aluminum, biscyclopentadienylzirconiumdichloride-triisobutylaluminum, biscyclopentadienylzirconiumdimethyl-n-butyllithium, biscyclopentadienylzirconiumdimethyl-diethylzinc, biscyclopentadienylzirconiumdimethyl-diethylmagnesium, biscyclopentadienylzirconiumdimethyl-ethylmagnesiumchloride, biscyclopentadienylzirconiumdimethyl-triethylaluminum, biscyclopentadienylzirconiumdimethyl-triisobutylaluminum, biscyclopentadienylzirconiumdibenzyl-n-butyllithium, biscyclopentadienylzirconiumdibenzyl-diethylzinc, biscyclopentadienylzirconiumdibenzyl-diethylmagnesium, biscyclopentadienylzirconiumdibenzyl-ethylmagnesiumchloride, biscyclopentadienylzirconiumdibenzyl-triethylaluminum, biscyclopentadienylzirconiumdibenzyl-triisobutylaluminum, $Ti(Oi-C_3H_7)_4$-triethylaluminium, $Ti(Oi-C_3H_7)_4$-triisobutylaluminium, $Ti(Oi-C_3H_7)_4$-n-butyllithium, $Ti(On-C_3H_7)_4$-triethylaluminium, $Ti(On-C_3H_7)_4$-triisobutylaluminium, $Ti(On-C_3H_7)_4$-n-butyllithium, $Ti(Oi-C_4H_9)_4$-triethylaluminium, $Ti(Oi-C_4H_9)_4$-triisobutylaluminium, $Ti(Oi-C_4H_9)_4$-n-butyllithium, $Ti(Ot-C_4H_9)_4$-triethylaluminium, $Ti(Ot-C_4H_9)_4$-triisobutylaluminium, $Ti(Ot-C_4H_9)_4$-n-butyllithium, $Ti(On-C_4H_9)_4$-triethylaluminium, $Ti(On-C_4H_9)_4$-triisobutylaluminium, $Ti(On-C_4H_9)_4$-n-butyllithiun, $Zm(Oi-C_3H_7)_4$-triethylaluminium, $Zr(Oi-C_3H_7)_4$-triisobutylaluminium, $Zr(Oi-C_3H_7)_4$-n-butyllithium, $Zr(On-C_3H_7)_4$-triethylaluminium, $Zr(On-C_3H_7)_4$-triisobutylaluminium, $Zr(On-C_3H_7)_4$-n-butyllithium, $Zr(Oi-C_4H_9)_4$-triethylaluminium, $Zr(Oi-C_4H_9)_4$-triisobutylaluminium, $Zr(Oi-C_4H_9)_4$-n-butyllithium, $Zr(Ot-C_4H_9)_4$-triethylaluminium, $Zr(Ot-C_4H_9)_4$-triisobutylaluminium, $Zr(Ot-C_4H_9)_4$-n-butyllithium, $Zr(On-C_4H_9)_4$-triethylaluminium, $Zr(On-C_4H_9)_4$-triisobutylaluminium, $Zr(On-C_4H_9)_4$-n-butyllithium, $VO(OC_2H_5)_3$-triethylaluminium, $VO(OC_2H_5)_3$-triisobutylaluminium, $VO(OC_2H_5)_3$-diisobutylaluminiumhydride, $VO(On-C_4H_9)_3$-triethylaluminium, $VO(On-C_4H_9)_3$-triisobutylaluminium, $VO(On-C_4H_9)_3$-diisobutylaluminiumhydride, $Co(Oi-C_3H_7)_3$-triethylaluminium, $Co(Oi-C_3H_7)_3$-triisobutylaluminium, $Co(Oi-C_3H_7)_3$-n-butyllithium, $Co(On-C_3H_7)_3$-triethylaluminium, $Co(On-C_3H_7)_3$-triisobutylaluminium, $Co(On-C_3H_7)_3$-n-butyllithium, $Co(Oi-C_4H_9)_3$-triethylaluminium, $Co(Oi-C_4H_9)_3$-triisobutylaluminium, $Co(Oi-C_4H_9)_3$-n-butyllithium, $Co(Ot-C_4H_9)_3$-triethylaluminium, $Co(Ot-C_4H_9)_3$-triisobutylaluminium, $Co(Ot-C_4H_9)_3$-n-butyllithium, $Co(On-C_4H_9)_3$-triethylaluminium, $Co(On-C_4H_9)_3$-triisobutylaluminium, $Co(On-C_4H_9)_3$-n-butyllithium, $Co(On-C_8H_{17})_3$-triethylaluminium, $Co(On-C_8H_{17})_3$-triisobutylaluminium, $Co(On-C_8H_{17})_3$-n-butyllithium, $Cr(acetylacetonato)_3$-triethylaluminium, $Cr(acetylacetonato)_3$-triisobutylaluminium, $MoO_2(acetylacetonato)_2$-triethylaluminium, $MoO_2(acetylacetonato)_2$-triisobutylaluminium, $Mn(acetylacetonato)_3$-triethylaluminium, $Mn(acetylacetonato)_3$-triisobutylaluminium, $Mn(acetylacetonato)_2$-triethylaluminium, $Mn(acetylacetonato)_2$-triisobutylaluminium, $Fe(acetylacetonato)_3$-triethylaluminium, $Fe(acetylacetonato)_3$-triisobutylaluminium, $Co(acetylacetonato)_3$-triethylaluminium, $Co(acetylacetonato)_3$-triisobutylaluminium, $Ru(acetylacetonato)_3$-triethylaluminium, $Ru(acetylacetonato)_3$-triisobutylalumium, $Co\{(C_6H_5)_3P\}_2Cl_2$-triethylaluminium, $Co\{(C_6H_5)_3P\}_2Cl_2$-triisobutylaluminium, $Ni(acetylacetonato)2$-triethylaluminium, $Ni(acetylacetonato)2$-triisobutylaluminium, $Ni\{(n-C_4H_9)_3P\}_2Cl_2$-triethylaluminium, $Ni\{(n-C_4H_9)_3P\}_2Cl_2$-triisobutylaluminium, $Pd\{(n-C_4H_9)_3P\}_2Cl_2$-triethylaluminium, $Pd\{(n-C_4H_9)_3P\}_2Cl_2$-triisobutylaluminium, chlorotris(triphenylphosphine)rhodium, hydridecarbonyltris(triphenylphosphine)rhodium, rhodium acetate, ruthenium acetate, chlorohydridetris (triphenylphosphine)ruthenium, carboxylatohydridetris (triphenylphosphine)ruthenium, hydridecarbonyltris (triphenylphosphine)iridium, trihydridetris (triphenylphosphine)cobalt, chlorocarbonylbis (triphenylphosphine)iridium, pentacyanocobalt(II) complex, tricyanobipyridinecobalt(II) complex, bis (dimethylglyoxymato)cobalt(II) complex, cobaltcarbonyl complex, allenetricarbonyl complex, bis (tricarbonylcyclopentadienylchromium) and pentacarbonyliron complex.

Among the above listed compounds, there may be also preferably used palladium black, nickel-diatomaceous earth (carrier), Raney nickel, biscyclopentadienyltitaniumdichloride-triisobutylaluminium, biscyclopentadienyltitaniumdimethyl-triisobutylaluminium, biscyclopentadienylzirconiumdichloride-triethylaluminium, $Ti(Oi-C_3H_7)_4$-triethylaluminium, $Ti(Oi-C_3H_7)_4$-triisobutylaluminium, $Ti(On-C_4H_9)_4$-triethylaluminium, $Ti(On-C_4H_9)_4$-triisobutylaluminium, $Co(On-C_8H_{17})_3$-triethylaluminium, $Co(On-C_8H_{17})_3$-triisobutylaluminium, $Co(acetylacetonato)_3$-triethylaluminium, $Co(acetylacetonato)_3$-triisobutylaluminium, $Ni(acetylacetonato)_2$-triethylaluminium, $Ni(acetylacetonato)_2$-triisobutylaluminium and chlorotris (triphenylphosphine)rhodium.

The term inorganic carrier (F) as used herein denotes such a material which may be intrinsically in the form of powder, granule, flake, foil or fiber, but whatever the shape may be, it should be 5–200 µm, preferably 10–100 µm in maximum length. The inorganic carrier is preferably porous, having a surface area of 30–1,000 $m^2/g$ and a pore volume of 0.1–3 $cm^3/g$. It may be chosen from the group of a carbonaceous material, a metal, a metal oxide, a metal chloride and a metal carbonate, or a mixture thereof, which is calcined usually at 200°–900° C. in the air, nitrogen, argon or other inert gas. Suitable metals for the inorganic carrier (F) are iron, aluminum and nickel. Eligible metal oxides are the Group I–VIII metal oxides of the Periodic Table including $SiO_2$, $Al_2O_3$, MgO, CaO, $B_2O_3$, $TiO_2$, $ZrO_2$, $Fe_2O_3$, $SiO_2.Al_2O_3$, $Al_2O_3.MgO$, $Al_2O_3.CaO$, $Al_2O_3.MgO.CaO$, $Al_2O_3.MgO.SiO_2$, $Al_2O_3.CuO$, $Al_2O_3.Fe_2O_3$, $Al_2O_3.NiO$ and $SiO_2.MgO$. The double oxides are not particularly restricted in terms of structure and component ratio when used in the invention. The metal oxides may have adsorbed thereto small quantities of moisture and may further contain a small amount of impurities.

The metal chloride used in the invention is a chloride of an alkaline metal or alkaline earth metal, preferably $MgCl_2$ and $CaCl_2$. Examples of the metal carbonate are magnesium carbonate, calcium carbonate and barium carbonate, while those of the carbonaceous material referred to herein are carbonblack and activated carbon. Any of these metal oxides are preferred for use as the inorganic carrier materials, and the metal oxides, silica and alumina are particularly preferred.

The term particulate polymer carrier (F) as used herein designates a solid particulate form of either thermoplastic or thermosetting resin having an average particle size 5–2,000 µm, preferably 10–100 µm, practically ranging from low molecular weight to ultra high molecular weight polymers as long as these polymers remain solid during the stages of catalyst preparation and polymerization reaction. Specific examples of the particulate polymer include particulate ethylene polymers, ethylene alpha-olefin copolymers, propylene polymers or copolymers, poly-1-butene and like polyolefins preferably of 2–12 carbon atoms, polyester, polyamide, polyvinylchloride, polymethylacrylate, polymethylmethacrylate, polystyrene, polynorbornene and naturally occurring polymers as well as mixtures thereof. The foregoing inorganic and particulate polymer carriers per se may be used as Component (F) according to the invention. Alternatively, they may be pretreated with an organoaluminum compound such as trimethylaluminum, triethylaluminum, triisobutylaluminum, tri-n-hexylaluminum, dimethylaluminum chloride, diethylaluminum chloride and diethylmonoethoxyaluminum, or an Al—O—Al bond-containing organoaluminum compound (Component B), or silane compound.

The inorganic carrier (F) may be used after treatment with an active hydrogen-containing compound such as alcohol and aldehydes, an electron-donative compound such as ester and ether, or an alkoxide-containing compound such as tetraalkoxysilicate, trialkoxyaluminum and transition-metal tetraalkoxide.

The carriers may be contacted with various pretreating compounds in an atmosphere of an inert gas such as nitrogen or argon in the presence of an inert liquid hydrocarbon such as an aromatic hydrocarbon ($C_6$–$C_{12}$) including benzene, toluene, xylene and ethylbenzene or an aliphatic or alicyclic hydrocarbon ($C_5$–$C_{12}$) including heptane, hexane, decane, dodecane and cyclohexane, with or without stirring at a temperature of –100°–200° C., preferably –50°–100° C. for 30 minutes to 50 hours, preferably 1–24 hours. This pretreatment reaction is carried out preferably in the presence of a solvent of an aromatic hydrocarbon ($C_6$–$C_{12}$) such as benzene, toluene, xylene and ethylbenzene in which the pretreating compounds are rendered soluble. The resulting reaction mixture may be readily put to use for the preparation of catalyst components without having to remove the solvent. Part or all of the aromatic hydrocarbon may be removed from the resulting reaction mixture. Alternatively, the pretreated carrier may be precipitated and recovered from the reaction mixture by adding an inert liquid hydrocarbon such as pentane, hexane, decane, dodecane or cyclohexane.

In order to enhance the various effect of the present invention, it is preferred that Components (C), (D) and (F) or (C) and (F) or (E) and (F) are contacted together in advance and then contacted together Components (A) and (B).

Components (A) and (B) are contacted together in the presence of nitrogen, argon and other inert gas, or an inert liquid hydrocarbon solvent such as an aromatic hydrocarbon including benzene, toluene, xylene and ethylbenzene and an aliphatic or alicyclic hydrocarbon including heptane, hexane, decane, dodecane and cyclohexane, with or without stirring at a temperature of from –100° to 200° C., preferably from –50° to 150° C., for a period of from 5 minutes to 250 hours, preferably from 30 minutes to 24 hours.

In the case where Components (A) and (B) are contacted together in the inert hydrocarbon solvents, upon completion of the reaction the resultant catalyst composition maintained in the solution state may be contacted together with Catalyst component (II) or Catalyst Component (II) and Component (F). Alternatively, the above resulted catalyst may be maintained in solid phase by means of precipitation and drying and put to use for the contact of Catalyst Component (II) or Catalyst Component (II) and Component (F). The contacting operation may be carried out more than twice.

The amount of the pretreating compound is usually 1–10, 000 millimoles, preferably 5–1,500 millimoles (or Al atom concentration in the case of a modified aluminum compound) per 100 grams of the carrier.

The amount of addition of Components (B) is in the range of 1–10,000 mols, preferably 5–1,000 mols, more preferably 10–500 mols per mol of Component (A).

Components (C) and (D) are contacted together in the presence of nitrogen, argon and other inert gas, or an inert liquid hydrocarbon solvent such as an aromatic hydrocarbon including benzene, toluene, xylene and ethylbenzene and an aliphatic or alicyclic hydrocarbon including heptane, hexane, decane, dodecane and cyclohexane, with or without stirring at a temperature of from −100° C. to 200° C., preferably from −50° to 150° C., for a period of from 5 minutes to 250 hours, preferably from 30 minutes to 24 hours. This contact operation is conducted preferably with use of such aromatic hydrocarbons (i.e. benzene, toluene, xylene and ethylbenzene) in which Components (C) and (D) are more readily soluble and preferably in nitrogen atmosphere in which instance the amount of Component (D) is usually 0.01–1,000, preferably 0.05–200, more preferably 0.5– 20 mols per mol of Component (C).

The amount of addition of each of Components (C) and (E) in Catalyst Component (II) is in the range of 0.01–100 mols, preferably 0.1–10 mols per mol of Component (A) in Catalyst Component (I).

The catalyst composition according to the invention results from contacting the carrier (F) with either of the Catalyst Components (I) and (II) during or after the preparation of the latter. More specifically, for purposes of illustration, according to one embodiment of the invention, the carrier (F) is contacted with Catalyst Component (I) in the following sequence:

1. Reaction product of (A) and (B) is contacted with (F)
2. Reaction product of (A) and (F) is contacted with (B)
3. Reaction product of (B) and (F) is contacted with (A)

Sequences 1 and 2 are preferred.

Components (A), (B) and (F) are contacted together in the presence of nitrogen, argon and other inert gas, or an inert liquid hydrocarbon solvent such as an aromatic hydrocarbon including benzene, toluene, xylene and ethylbenzene and an aliphatic or alicyclic hydrocarbon including heptane, hexane, decane, dodecane and cyclohexane, with or without stirring at a temperature of from −100° to 200° C., preferably from −50° to 150° C., for a period of from 5 minutes to 250 hours, preferably from 30 minutes to 24 hours. This contact operation is conducted preferably with use of such aromatic hydrocarbons (i.e. benzene, toluene, xylene and ethylbenzene) in which Components (A) and (B) are more readily soluble. If the contact operation is carried out through multi-stages, the components may be contacted together throughout the stages without having to remove the aromatic hydrocarbon solvent used in the first stage. Alternatively, the aromatic hydrocarbons may be removed upon completion of the first stage by addition of an insoluble or hardly soluble inert hydrocarbon liquid such as an aliphatic or alicyclic hydrocarbon solvent including pentane, hexane, decane, dodecane and cyclohexane which allows the reaction product to precipitate and thereafter replaced with any of the aforesaid inert hydrocarbon solvents. The contacting operation may be carried out more than twice.

The amount of Component (A) is usually below 5 millimols, preferably in the range of 0.0001–5 millimols, more preferably 0.001–0.5 millimols, most preferably 0.01 –0.1 millimol per gram of Component (F), if the latter is used.

According to another embodiment of the invention, the carrier (F) is contacted with Catalyst Component (II), more specifically, Components (C) and (D), or Component (C) alone, or Component (E) alone, and preferably further with a reaction product of Components (A) and (B).

The sequence of contacting (F) with (II) is not particularly restrictive, but may be for purposes of illustration as follows:

4. Reaction product of (C) and (D) is contacted with (F)
5. Reaction product of (D) and (F) is contacted with (C)
6. Reaction product of (F) and (C) is contacted with (D)
7. (E) is supported on (F)
8. (C) is contacted with (F).

Sequences 4 and 5 are preferred.

Component (C), Components (C) and (D), or Component (E) each are contacted with Component (F) in the presence of nitrogen, argon and other inert gas, or an inert liquid hydrocarbon solvent such as an aromatic hydrocarbon including benzene, toluene, xylene and ethylbenzene and an aliphatic or alicyclic hydrocarbon including heptane, hexane, decane, dodecane and cyclohexane, with or without stirring at a temperature of from −100° to 200° C., preferably from −50° to 150° C., for a period of from 5 minutes to 250 hours, preferably from 30 minutes to 24 hours. This contact operation is conducted preferably with use of such aromatic hydrocarbons (i.e. benzene, toluene, xylene and ethylbenzene) in which Components (C) and (D) are more readily soluble. If the contact operation is carried out through multi-stages, the components may be contacted together throughout the stages without having to remove the aromatic hydrocarbon solvent used in the first stage. Alternatively, the aromatic hydrocarbons may be removed upon completion of the first stage by addition of an insoluble or hardly soluble inert hydrocarbon liquid such as an aliphatic or alicyclic hydrocarbon solvent including pentane, hexane, decane, dodecane and cyclohexane which allows the reaction product to precipitate and thereafter replaced with any of the aforesaid inert hydrocarbon solvents. The contacting operation may be carried out more than twice.

When contacting each Compound (C), Components (C) and (D), or Component (E) with Component (F), the amount of addition of either Component (C) or (E) is in the range of usually 0.0001–5 millimols, preferably 0.001–0.5 millimols, more preferably 0.01–0.1 millimol.

The order in which Catalysts Components (I) and (II) and Carrier (F) are contacted together is exemplified as follows:

9. Reaction product of (I) and (II) is contacted with (F)
10. Reaction product of (II) and (F) is contacted with (I)
11. Reaction product of (F) and (I) is contacted with (II)

Contact order 10 above is particularly preferred for better results.

When contacting (I), (II) and (F) together, the amount of addition of each of (A) in (I) and (C) or (E) in (II) is in the range of usually 0.00005–2.5 millimols, preferably 0.0005–0.25 millimol, more preferably 0.005–0.05 millimol per gram of (F).

The contacting operation, which may be repeated as many times as desired, may be carried out in the presence of nitrogen, argon and other inert gas, or an inert liquid hydrocarbon solvent such as an aromatic hydrocarbon including benzene, toluene, xylene and ethylbenzene and an aliphatic or alicyclic hydrocarbon including heptane, hexane, decane, dodecane and cyclohexane, with or without stirring at a temperature of from −100° C. to 200° C., preferably from −50° to 150° C., for a period of from 5 minutes to 250 hours, preferably from 30 minutes to 24 hours.

This operation is conducted preferably with use of such aromatic hydrocarbons (i.e. benzene, toluene, xylene and ethylbenzene) in which Catalyst Components (I) and (II) are more readily soluble.

When the contacting reaction is carried out in stages, the soluble aromatic hydrocarbon solvent used in the preceding stage may be further effectively used in the next stage. Alternatively, such an inert liquid hydrocarbon (i.e. pentene, hexane, decane and cyclohexane) in which certain components are insoluble or hardly soluble may be added and used in the latter stage wherein the reaction product remains in solid phase.

Catalyst Components (I) and (II) according to the invention may be fed to the polymerization system separately or after being initially contacted together at a temperature in the range of usually from −100° to 200° C., preferably from 50° to 150° C. for a time length of from 1 minutes to 250 hours, preferably from 5 minutes to 24 hours, regardless of whether either or both of the components (I) and (II) are solid or liquid.

There may be used some additional components in the preparation of the inventive catalysts such as hydrocarbon halide compound, hydrocarbon-including oxygen halide compound and halogen carbon compound having C—X bond (X:halogen such as fluorine) as well as borane and borate.

The mixing ratio of catalyst component (I) to catalyst component (II) is preferably such that the amount of the transition metal compound in (II) is held in the range of 0.01–100 mols, preferably 0.1–10 mols per mol of component (A) in (I).

The inventive catalysts may be applied to slurry, solution and vapor polymerization processes, of which vapor-phase process is preferred. Slurry or solution polymerization may be conducted in the presence of solvents such as alicyclic hydrocarbons including cyclohexane and methylcyclohexane, aromatic hydrocarbons including benzene, toluene and xylene, or aliphatic hydrocarbons including hexane and heptane. The reaction is conducted in a substantially oxygen-free, moisture-free environment at temperatures of from 20° to 200° C., preferably 50° to 100° C., at pressures of from atmospheric to 70 kg/cm$^2$G, preferably atmospheric to 20 kg/cm$^2$G and for timelengths of from 5 minutes to 20 hours, preferably 30 minutes to 10 hours.

The term olefins as used herein embraces alpha-olefins, cyclic olefins, dienes and trienes.

Eligible α-olefins are such having a carbon number of 2 to 12, preferably 2 to 8, and chosen from ethylene, propylene, butene-1, hexene-1, 4-methylpentene-1 and the like. They may be homopolymerized or copolymerized as by a process mode of alternating, random or block copolymerization. Exemplified as α-olefin copolymers are those of ethylene with an α-olefin comonomer of a carbon number of 3 to 12, preferably 3 to 8, such as ethylene-propylene, ethylene-butene-1, ethylene-hexene-1 or ethylene-4-methylpentene-1, or of propylene with an α-olefin comonomer of a carbon number of 3 to 12, preferably 3 to 8, such as propylene-butene-1, propylene-4-methypentene-1, propylene-4-methylbutene-1, propylene-hexene-1 or propylene-octene-1. In either copolymer, the content of the comonomer may be less than 90% by mol of the total monomer. Generally, ethylene-based copolymers have a comonomer content of not more than 40%, preferably smaller than 30%, more preferably below 20%, whereas propylene-based copolymers have a similar content in the range of 1 to 90%, preferably 5 to 90%, more preferably 10 to 70%, each such percentage being by mol of the total monomer.

Suitable cyclic olefins include those having a carbon number of 3 to 24, preferably 3 to 18, such as cyclopentene, cyclobutene, cyclohexene, 3-methylcyclohexene, cyclooctene, cyclodecene, cyclododecene, tetracyclodecene, octacyclodecene, dicyclopentadiene, norbornene, 5-methyl-2-norbornene, 5-ethyl-2-norbornene, 5-isobutyl-2-norbornene, 5,6-dimethyl-2-norbonene, 5,5,6-trimethyl-2-norbornene and ethylidene-norbornene. They may be copolymerized usually with the above α-olefins, in which instance the content of the cyclic olefin in the resulting copolymer is in the range of 1 to 50% by mol, preferably 2 to 50% by mol.

Suitable dienes and trienes are polyenes of a carbon number of 4 to 26, preferably 6 to 26. Examples include butadine, 1,3-pentadiene, 1,4-pentadiene, 1,3-hexadiene, 1,4-hexadiene, 1,5-hexadiene, 1,3-cyclohexadiene, 1,4-cyclohexadiene, 1,9-decadiene, 1,3-tetradecadiene, 2,6-dimethyl-1,5-heptadiene, 2-methyl-2,7-octadiene, 2,7-dimethyl-2,6-octadiene, 2,3-diemthylbutadiene, ethylidene norbornene, dicyclopentadiene, isoprene, 1,3,7-octatriene and 1,5,9-decatriene. Chain dienes or trienes may be copolymerized usually with the above α-olefins and contained in the resultant copolymer usually in an amount of 0.1 to 50% by mol, preferably 0.2 to 10% by mol.

There may be added in the polymerization reaction system certain scavengers for removing moisture and other impurities, such scavengers exemplarily including trimethylaluminum, triethylaluminum, triisobutylaluminum, the aforementioned modified organoaluminum compound, and a modified organoaluminum having a branched-alkyl group.

The polymerization process of the invention is characterized by controlling the molecular weight of the resultant polymer by means distinct from what is known in the art, but this is meant in no way to exclude the conventional method in which such molecular weight control is effected by adjusting the polymerization reactions such as temperature, pressure, catalyst quantity, hydrogen partial pressure and other parameters. The inventive process can be applied to multi-stage polymerization involving different reaction conditions.

The invention will be further described by way of the following examples.

The melt flow rate (MFR) and the number-average molecular weight (Mn) of each of the polymers obtained in the respective Examples were determined by the following methods.

MFR Measurement

The method of ASTM D1238-57T was followed in which the test was conducted at 190° C. with a load of 2.16 kg. Adjustment of MFR was taken as an index of the molecular weight of the polymer.

Mn Measurement

This was determined by a gel permeation chromatography (Waters Co. Product Model 150-C) with use of an ortho-dichlorobenzene at 135° C.

INVENTIVE EXAMPLE 1

1. Preparation of Catalyst (I)

A 500 ml three-necked flask equipped with an electro-magnetic induction stirrer was charged in nitrogen atmosphere with 6.0×10$^{-3}$ mols bis-cyclopentadienyl-dimethoxy zirconium and 200 ml toluene solution of methylaluminoxane (3.0 mmols Al/ml, manufactured by Sherring Co., Ltd.). The admixture was allowed to react at room temperature for one hour.

2. Preparation of Catalyst (II)

A 100 ml three-necked flask equipped with an electromagnetic induction stirrer was charged in nitrogen atmosphere with 6 mmols cobalt octoate and 18 ml (18 mmols) hexane solution of triethyl aluminum (1.0 mmol Al/ml). The admixture was stirred at room temperature and atmospheric for 2 hours.

3. Polymerization

A 3-liter stainless steel autoclave equipped with stirrer was purged with nitrogen and charged with 200 grams ocean sand which had been washed with acid and treated at 300° C. The autoclave was allowed to dry fully at 80° C. in vacuum, followed by a charge of 2 ml catalyst (I) and then 0.03 ml catalyst (II). Polymerization was effected with a continuous supply of a mixture gas of ethylene and 1-butene (at butene/ethylene ratio of 0.2) at 80° C. for 2 hours with a total pressure maintained at 9 kgf/cm$^2$·G. Catalytic activity was 141 kg/g.Zr. MFR was 1.6 g/10 min. Mn was 63,600.

INVENTIVE EXAMPLE 2

The procedure of Inventive Example 1 was followed except that the amount of catalyst (II) was 0.06 ml.

Catalytic activity: 138 kg/g.Zr
MFR: 1.0 g/10 min.
Mn: 69,200

Comparative Example 1

The procedure of Inventive Example 1 was followed except that the catalyst (II) was not used.

Catalytic activity: 133 kg/g.Zr
MFR: 2.8 g/10 min.
Mn: 53,500

INVENTIVE EXAMPLE 3

1. Preparation of Solid Catalyst (I)

A 500 ml three-necked flask equipped with an electro-magnetic induction stirrer was charged in nitrogen atmosphere with 6.0×10$^{-3}$ mols biscyclopentadienyl zirconium dichloride and 200 ml toluene solution of methylaluminoxane (3.0 mmols Al/ml of Sherring Co., Ltd.). The admixture was reacted at room temperature with stirring for one hour thereby providing a catalyst solution.

A one-liter three-necked flask equipped with an electro-magnetic induction stirrer and a cooling tube was charged in nitrogen atmosphere with 150 grams silica (#952 of Fuji-Davison) which had been calcined at 500° C. for 7 hours. The flask was allowed to dry at 150° C. in vacuum for one hour. Thereafter, the flask was cooled to room temperature and charged with the above catalyst solution to effect reaction at room temperature for one hour. The reaction mixture was heated to 40° C. to provide a slurry. This slurry was dried in vacuum for 60 minutes to remove the solvent thereby providing 201 grams solid catalyst with good flowability.

2. Preparation of Catalyst (II)

A 100 ml three-necked flask equipped with an electro-magnetic induction stirrer was charged in nitrogen atmosphere with 6 mmols bis-cyclopentadienyl titanium dichloride and 12 ml (12 mmols) hexane solution of triisobutyl aluminum (1.0 mmol Al/ml). The admixture was reacted with stirring at room temperature and atmospheric for 2 hours.

3. Polymerization

A 3-liter stainless steel autoclave equipped with stirrer was purged with nitrogen and heated to 75° C., followed by addition of 0.3 ml toluene dilute solution of triethyl aluminum (1 mmol/ml) to scavenge the polymerization system. 0.03 ml catalyst (II) was added, followed by charging a mixture of ethylene and butene-1 (0.15 butene-1/ethylene mol ratio) up to a total pressure of 8 kgf/cm$^2$·G. 100 mg (Zr=0.27 mg) solid catalyst (I) was fed to initiate polymerization. Ethylene/butene-1 gas (0.05 mol ratio butene-1/ethylene) was continuously supplied to continue the reaction under a total pressure maintained at 9 kgf/cm$^2$·G for 2 hours. Upon completion of the reaction, excess gas was removed and the system was cooled to provide 43 grams white polymer.

Catalytic activity: 158 kg/g.Zr
MFR: 1.2 g/10 min.
Mn: 67,200

Comparative Example 2

The procedure of Inventive Example 3 was followed except that the amount of solid catalyst (I) was 111 mg (Zr=0.30 mg) and that catalyst (II) was not used. Upon completion of the reaction, the system was cleared of excess gas and cooled to provide 50 grams white polymer.

Catalytic activity: 152 kg/g.Zr
MFR: 2.6 g/10 min.
Mn: 55,100

INVENTIVE EXAMPLE 4

1. Preparation of Solid Catalyst (I)

A 500 ml three-necked flask equipped with an electro-magnetic induction stirrer was charged in nitrogen atmosphere with 6.0×10$^{-3}$ mols bis-cyclopentadienyl zirconium dimethyl and 200 ml toluene solution of methylaluminoxane (3.0 mmols Al/ml of Sherring Co., Ltd.). The admixture was reacted at room temperature with stirring for one hour thereby providing a catalyst solution.

A one-liter three-necked flask equipped with an electro-magnetic induction stirrer and a cooling tube was charged in nitrogen atmosphere with 150 grams silica (#952 of Fuji-Davison) which had been calcined at 500° C. for 7 hours. The flask was allowed to dry at 150° C. in vacuum for one hour. Thereafter, the flask was cooled to room temperature and charged with the above catalyst solution to effect reaction at room temperature for one hour. The reaction mixture was heated to 40° C. to provide a slurry. This slurry was dried in vacuum for 60 minutes to remove the solvent thereby providing 199 grams solid catalyst.

2. Preparation of Catalyst (II)

A 100 ml three-necked flask equipped with an electro-magnetic induction stirrer was charged in nitrogen atmosphere with 6 mmols tetraisopropyl-ortho-titanate and 20 ml (20 mmols) hexane solution of triisobutyl aluminum (1.0 mmol Al/ml). The admixture was reacted with stirring at room temperature and atmospheric for 2 hours.

3. Polymerization

A 3-liter stainless steel autoclave equipped with stirrer was purged with nitrogen and heated to 75° C., followed by addition of 0.3 ml toluene dilute solution of triethyl aluminum (1 mmol/ml) to scavenge the polymerization system. 105 mg (Zr=0.29 mg) solid catalyst (I) was added, followed by charging 0.03 ml catalyst (II) together with a mixture of ethylene and butene-1 (0.15 mol ratio butene-1/ethylene) up to a total pressure of 9 kgf/cm$^2$·G to initiate polymerization. Ethylene/butene-1 gas (0.05 mol ratio butene-1/ethylene) was continuously supplied to continue the reaction under a total pressure maintained at 9 kgf/cm$^2$·G for 2 hours. Upon completion of the reaction, excess gas was removed and the system was cooled to provide 37 grams white polymer.

Catalytic activity: 128 kg/g.Zr
MFR: 0.31 g/10 min.
Mn: 92,600

Comparative Example 3

The procedure of Inventive Example 4 was followed except that the amount of solid catalyst (I) was 95 mg (Zr=0.26 mg) and that catalyst (II) was not used. There was obtained 37 grams white polymer.

Catalytic activity: 142 kg/g·Zr
MFR: 1.8 g/10 min.
Mn: 62,100

INVENTIVE EXAMPLE 5

1. Preparation of Solid Catalyst (I)

A 500 ml three-necked flask equipped with an electromagnetic induction stirrer was charged in nitrogen atmosphere with $6.0 \times 10^{-3}$ mols ethylene-bis-indenyl zirconium dichloride and 200 ml toluene solution of methylaluminoxane (3.0 mmols Al/ml of Sherring Co., Ltd.). The admixture was reacted at room temperature with stirring for one hour thereby providing a catalyst solution.

A one-liter three-necked flask equipped with an electromagnetic induction stirrer and a cooling tube was charged in nitrogen atmosphere with 150 grams silica (#952 of Fuji-Davison) which had been calcined at 500° C. for 7 hours. The flask was allowed to dry at 150° C. in vacuum for one hour. Thereafter, the flask was cooled to room temperature and charged with the above catalyst solution to effect reaction at room temperature for one hour. The reaction mixture was heated to 40° C. to provide a slurry. This slurry was dried in vacuum for 60 minutes to remove the solvent thereby providing 190 grams solid catalyst.

2. Preparation of Catalyst (II)

A 100 ml three-necked flask equipped with an electromagnetic induction stirrer was charged in nitrogen atmosphere with 6 mmols tetraisopropyl ortho-titanate and 20 ml (20 mmols) hexane solution of triethyl aluminum (1.0 mmol Al/ml). The admixture was reacted with stirring at room temperature and atmospheric for 2 hours.

3. Polymerization

A 3-liter stainless steel autoclave equipped with stirrer was purged with nitrogen and heated to 75° C., followed by addition of 0.3 ml toluene dilute solution of triethyl aluminum (1 mmol/ml) to scavenge the polymerization system. 105 mg (Zr=0.29 mg) solid catalyst was fed, followed by charging 0.03 ml catalyst (II) together with a mixture of ethylene and butene-1 (0.15 butene-1/ethylene mol ratio) up to a total pressure of 9 kgf/cm²·G to initiate polymerization. Ethylene/butene-1 gas (0.05 mol ratio butene-1/ethylene) was continuously supplied to continue the reaction under a total pressure maintained at 9 kgf/cm²·G for 2 hours. Upon completion of the reaction, excess gas was removed and the system was cooled to provide 40 grams white polymer.

Catalytic activity: 138 kg/g·Zr
MFR: 0.67 g/10 min.
Mn: 79,700

Comparative Example 4

The procedure of Inventive Example 5 was followed except that the amount of solid catalyst (I) was 98 mg (Zr=0.26 mg) and that catalyst (II) was not used. There was obtained 35 grams white polymer.

Catalytic activity: 133 kg/g·Zr
MFR: 1.1 g/10 min
Mn: 68,100

INVENTIVE EXAMPLE 6

1. Preparation of Solid Catalyst (I)

A 500 ml three-necked flask equipped with an electromagnetic induction stirrer was charged in nitrogen atmosphere with $6.0 \times 10^{-3}$ mols bis-cyclopentadienyl zirconium dichloride and 200 ml toluene solution of methylaluminoxane (3.0 mmols Al/ml of Sherring Co., Ltd.). The admixture was reacted at room temperature with stirring for one hour thereby providing a catalyst solution.

A one-liter three-necked flask equipped with an electromagnetic induction stirrer and a cooling tube was charged in nitrogen atmosphere with 150 grams fully dry styrene/divinyl benzene copolymer beads (manufactured by Organo Co., Ltd.). The flask was allowed to dry at 90° C. in vacuum for one hour. Thereafter, the flask was cooled to room temperature and charged with the above catalyst solution to effect reaction at room temperature for one hour. The reaction mixture was heated to 40° C. to provide a slurry. This slurry was dried in vacuum for 60 minutes to remove the solvent thereby providing 201 grams solid catalyst with good flowability.

2. Preparation of Catalyst (II)

A 100 ml three-necked flask equipped with an electromagnetic induction stirrer was charged in nitrogen atmosphere with 6 mmols bis-cyclopentadienyl titaniumdichloride and 12 ml (12 mmols) hexane solution of triethyl aluminum (1.0 mmol Al/ml). The admixture was reacted with stirring at room temperature and atmospheric for 2 hours.

3. Polymerization

A 3-liter stainless steel autoclave equipped with stirrer was purged with nitrogen and heated to 75° C., followed by addition of 0.3 ml toluene dilute solution of triethyl aluminum (1 mmol/ml) to scavenge the polymerization system. 107 mg (Zr=0.29 mg) solid catalyst (I) was added, followed by charging 0.03 ml catalyst (II) together with a mixture of ethylene and butene-1 (0.15 mol ratio butene-1/ethylene) up to a total pressure of 9 kgf/cm2·G to initiate polymerization. Ethylene/butene-1 gas (0.05 mol ratio butene-1/ethylene) was continuously supplied to continue the reaction under a total pressure maintained at 9 kgf/cm²·G for 2 hours. Upon completion of the reaction, excess gas was removed and the system was cooled to provide 35 grams white polymer.

Catalytic activity: 121 kg/g·Zr
MFR: 1.4 g/10 min.
Mn: 65,000

Comparative Example 5

The procedure of Inventive Example 6 was followed except that the amount of solid catalyst (I) was 102 mg (Zr-0.28 mg) and that catalyst (II) was not used. There was obtained 37 grams white polymer.

Catalytic activity: 133 kg/g·Zr
MFR: 2.5 g/10 min.
Mn: 56,700

INVENTIVE EXAMPLE 7

1. Preparation of Solid Catalyst (I)

The procedure of Inventive Example 3 was followed.

2. Preparation of Catalyst (II)

The procedure of Inventive Example 3 was followed.

3. Polymerization

A stirrer equipped stainless steel autoclave for vapor phase polymerization was connected with a loop made up of a blower, a flow controller and a dry cyclon and adjusted in temperature at 60° C. with water supplied to its jacket. The autoclave was charged with solid catalyst (I) at a rate of 100 mg/hr, catalyst (II) at a rate of 0.03 ml/hr and a mixture of butene-1/ethylene at a mol ratio adjusted to be 0.25 in the vapor phase. The polymerization raction was continued for 10 hours at a total pressure of 8 kgf/cm²·G with the system gases being circulated by the blower, while the resultant polymer was intermittently withdrawn.

Catalytic activity: 72 kg/g.Zr
MFR: 0.61 g/10 min.
Mn: 80,200

Comparative Example 6

The procedure of Inventive Example 7 was followed except that catalyst (II) was not used.
Catalytic activity: 75 kg/g.Zr
MFR: 1.6 g/10 min.
Mn: 63,800

INVENTIVE EXAMPLE 8

1. Preparation of Solid Catalyst (I)
The procedure of Inventive Example 1 was followed.
2. Preparation of Catalyst (II)
The procedure of Inventive Example 1 was followed.
3. Polymerization
A 3-liter stainless steel autoclave equipped with stirrer was purged with nitrogen and charged with one liter refined toluene and 0.3 ml toluene dilute solution of triethyl aluminum (1 mmol/ml) to scavenge the polymerization system. 2 ml catalyst solution (I) and 0.03 ml of catalyst (II) were added, followed by a continuous charge of a mixture of ethylene and butene-1 (0.2 butene-1/ethylene mol ratio) up to a total pressure of 9 kgf/cm$^2$·G at 80° C. at which the reaction was continued for 2 hours.
Catalytic activity: 258 kg/g.Zr
MFR: 0.02 g/10 min.
Mn: 112,000

INVENTIVE EXAMPLE 9

The procedure of Inventive Example 8 was followed except that the amount of catalyst (II) was charged to 0.06 ml.
Catalytic activity: 251 kg/g.Zr
MFR: 0.01 g/10 min.
Mn: 113,800

Comparative Example 7

The procedure of Inventive Example 8 was followed except that catalyst (II) was not used.
Catalytic activity: 265 kg/g.Zr
MFR: 0.05 g/10 min.
Mn: 104,600

INVENTIVE EXAMPLE 10

1. Preparation of Solid Catalyst (I)
The procedure of Inventive Example 1 was followed.
2. Polymerization
There was used a 3-liter, stirrer equipped stainless steel autoclave provided at its bottom with a honeycomb alumina carrying 0.02 mmol Raney-nickel.
The autoclave was purged with nitrogen and heated to 75° C., followed by addition of 0.3 ml toluene dilute solution of triethyl aluminum (1 mmol/ml) to scavenge the polymerization system. 103 mg (Zr=0.29 mg) solid catalyst (I) was fed followed by continuously charging a mixture of ethylene and butene-1 (0.15 butene-1/ethylene mol ratio) up to a total pressure of 9 kgf/cm$^2$·G to initiate polymerization. The reaction was continued for 2 hours with a continuous charge of a mixture of ethylene and butene-1 (0.05 butene-1/ethylene mol ratio) under a total pressure maintained at 9 kgf/cm2·G. Upon completion of the reaction, excess gas was removed and the system was cooled to provide 38 grams polymer.
Catalytic activity: 131 kg/g.Zr
MFR: 0.97 g/10 min.
Mn: 71,100

INVENTIVE EXAMPLE 11

1. Preparation of Catalyst
1) Preparation of Catalyst (I)
A 500 ml three-necked flask equipped with an electromagnetic induction stirrer and a cooling tube was charged in nitrogen atmosphere with 3.0×10$^{-3}$ mols biscyclopentadienylzirconiumdichloride and 100 ml toluene dilute solution of methylaluminoxane (3.0 mmols Al/ml, manufactured by Sherring Co., Ltd.). The admixture was reacted at room temperature with stirring for one hour.
2) Preparation of Catalyst (II)
A 100 ml three-necked flask equipped with an electromagnetic induction stirrer was charged in nitrogen atmosphere with 15 mmols cyclopentadienyltitaniumdichloride and 30 ml (30 mmols) hexane solution of triisobutylaluminum (1.0 mmol Al/ml). The admixture was stirred at room temperature and atmospheric pressure for 2 hours.
The catalyst (I) was added with 22 mml of the catalyst (II) at room temperature and atmospheric pressure for two hours to provide a solution. A 1-liter three-necked flask equipped with an electromagnetic induction stirrer and a cooling tube was charged in nitrogen atmosphere with 150 grams silica (No. 952 of Fuji Davison) which had been calcined at 500° C. for 7 hours, and heated up to 150° C., followed by vacuum-dry for one hour.
Whereupon, the flask was cooled down to room temperature and charged with the above solution followed by reaction at room temperature.
The flask was heated up to 40° C. to provide a slurry. The slurry was dried in vacuum to remove the solvent for 60 minutes, thereby obtaining 208 grams of fluidized solid catalyst.
2. Polymerization
A 3-liter stainless steel autoclave equipped with stirrer was purged with nitrogen and heated up to 75° C., followed by addition of a 0.03 ml toluene dilute solution of triethylaluminium (1 mmol/ml) for scavenging. A mix of ethylene and butene-1 gases (butene-1/ethylene molar ration of 0.15) was charged to bring the reactor pressure up to 8 kgf/cm$^2$G, followed by addition of 106 mg of the above catalyst (Zr=0.14 mg), whereupon polymerization reaction was initiated and continued for 2 hours with continued charge of a mixed gas of ethylene and butene-1 (butene-1/ethylene molar ratio of 0.05) to maintain the reaction system at 9 kgf/cm$^2$G.
Upon completion of the reaction, excess gas was removed from the reactor which was then cooled to provide 24.0 grams of white polymer.
Catalytic activity: 174 kg/g.Zr
MFR: 1.1 g/10 min.
Mn: 68,100

Comparative Example 8

The procedure of Inventive Example 11 was followed except for the use of 110 grams of the catalyst (Zr=0.15 mg) devoid of the catalyst (II), thereby obtaining 25 grams white polymer.
Catalytic activity: 167 kg/g.Zr
MFR: 2.3 g/10 min.
Mn: 57,800

INVENTIVE EXAMPLE 12

1. Preparation of Catalyst
1) Preparation of Catalyst (I)

A 500 ml three-necked flask equipped with an electromagnetic induction stirrer and a cooling tube was charged in nitrogen atmosphere with 3.0×10⁻³ mols biscyclopentadienylzirconiumdimethyl and 100 ml toluene solution of methylaluminoxane (3.0 mmols Al/ml of Sherring Co., Ltd.). The admixture was reacted at room temperature with stirring for one hour thereby providing a catalyst solution.

2) Preparation of Catalyst (II)

A 500 ml three-necked flask equipped with an electromagnetic induction stirrer and a cooling tube was charged in nitrogen atmosphere with 30 mmols tetraisopropyl orthotitanate and 100 ml (100 mmols) hexane solution of triisobutyl aluminium (1.0 mmol Al/ml). The admixture was stirred at room temperature and atmospheric pressure for 2 hours.

A 1-liter three-necked flask with an eletromagnetic induction stirrer and a cooling tube was charged in nitrogen atmosphere with 150 grams silica (No. 952 of Fuji Davison) which had been calcined at 500° C. for 7 hours, and heated up to 150° C., followed by vacuum-dry for one hour.

Whereupon, the flask was cooled down to room temperature and charged with 22 ml catalyst II and 100 ml refined toluene. The admixture was reacted at room temperature for one hour, followed by addition of total catalyst I. The resulting admixture was reacted at room temperature with stirring for one hour.

The flask was heated up to 40° C. to provide a slurry. The slurry was dried in vacuum to remove the solvent for 60 minutes, thereby obtaining 205 grams of fluidized solid catalyst.

2. Polymerization

A 3-liter stainless steel autoclave equipped with stirrer was purged with nitrogen and heated to 75° C., followed by addition of 0.3 ml toluene dilute solution of triethyl aluminum (1 mmol/ml) to scavenge the polymerization system. A mixture of ethylene and butene-1 (0.15 butene-1/ethylene mol ratio) was charged to bring a total pressure up to 9 kgf/cm²·G. 97 mg (Zr=0.13 mg) of the above solid catalyst was fed to initiate polymerization. Ethylene/butene-1 gas (0.05 mol ratio butene-1/ethylene) was continuously supplied to continue the reaction under a total pressure maintained at 9 kgf/cm²·G for 2 hours. Upon completion of the reaction, excess gas was removed and the system was cooled to provide 20 grams white polymer.

Catalytic activity: 153 kg/g.Zr
MFR: 0.25 g/10 min.
Mn: 93,500

Comparative Example 9

The procedure of Inventive Example 12 was followed except for the use of 103 mg of the catalyst (Zr=0.14 mg) devoid of the catalyst II, thereby obtaining 22 grams white polymer.

Catalytic activity: 156 kg/g.Zr
MFR: 1.6 g/10 min.
Mn: 63,700

INVENTIVE EXAMPLE 13

1. Preparation of Catalyst
1) Preparation of Catalyst (I)

A 500 ml three-necked flask equipped with an electromagnetic induction stirrer and a cooling tube was charged in nitrogen atmosphere with 3.0×10⁻³ mols ethylenebisindenylzirocniumdichloride and 100 ml toluene solution of methylaluminoxane (3.0 mmols Al/ml of Sherring Co., Ltd.). The admixture was reacted at room temperature with stirring for one hour thereby providing a catalyst solution.

2) Preparation of Catalyst (II)

A 500 ml three-necked flask equipped with an electromagnetic induction stirrer and a cooling tube was charged in nitrogen atmosphere with 30 mmols tetraisopropyl orthotitanate and 100 ml (100 mmols) hexane solution of triethyl aluminium (1.0 mmol Al/ml). The admixture was stirred at room temperature and atmospheric pressure for 2 hours.

A 1-liter three-necked flask with an electromagnetic induction stirrer and a cooling was charged in nitrogen atmosphere with 150 grams silica (No. 952 of Fuji Davison) which had been calcined at 500° C. for 7 hours, and heated up to 150° C., followed by drying in vacuum for one hour.

Whereupon, the flask was cooled down to room temperature and charged with 22 ml catalyst II and 100 ml refined toluene. The admixture was reacted at room temperature for one hour, followed by addition of total catalyst I. The resulting admixture was reacted at room temperature with stirring for one hour.

The flask was heated up to 40° C. to provide a slurry. The slurry was dried in vacuum to remove the solvent for 60 minutes, thereby obtaining 208 grams of fluidized solid catalyst.

2. Polymerization

A 3-liter stainless steel autoclave equipped with stirrer was purged with nitrogen and heated to 75° C., followed by addition of 0.3 ml toluene dilute solution of triethyl aluminum (1 mmol/ml) to scavenge the polymerization system. A mixture of ethylene and butene-1 (0.15 butene-1/ethylene mol ratio) was charged to bring a total pressure up to 9 kgf/cm²·G. 97 mg (Zr=0.13 mg) solid catalyst was fed to initiate polymerization. Ethylene/butene-1 gas (0.05 mol ratio butene-1/ethylene) was continuously supplied to continue the reaction under a total pressure maintained at 9 kgf/cm²·G for 2 hours. Upon completion of the reaction, excess gas was removed and the system was cooled to provide 22 grams white polymer.

Catalytic activity: 166 kg/g.Zr
MFR: 0.53 g/10 min.
Mn: 82,100

Comparative Example 10

The procedure of Inventive Example 13 was followed except for the use of 101 mg catalyst (Zr=0.14 mg) (devoid of the catalyst II), thereby obtaining 22 grams white polymer.

Catalytic activity: 146 kg/g.Zr
MFR: 1.0 g/10 min.
Mn: 68,000

INVENTIVE EXAMPLE 14

1. Preparation of Catalyst
1) Preparation of Catalyst (I)

A 500 ml three-necked flask equipped with an electromagnetic induction stirrer and a cooling tube was charged in nitrogen atmosphere with 3.0×10⁻³ mols biscyclopentadienylzirconiumdichloride and 100 ml toluene dilute solution of methylaluminoxane (3.0 mmols Al/ml, manufactured by Sherring Co., Ltd.). The admixture was reacted at room temperature with stirring for one hour.

2) Preparation of Catalyst (II)

A 500 ml three-necked flask equipped with an electromagnetic induction stirrer was charged in nitrogen atmosphere with 100 ml refined toluene, 30 mmols biscyclopentadienyltitaniumdichloride and 60 ml (60 mmols) hexane solution of triethylaluminum (1.0 mmol Al/ml). The admixture was stirred at room temperature and atmospheric pressure for 2 hours.

A 1-liter three-necked flask with an electromagnetic induction stirrer and a cooling tube was charged in nitrogen atmosphere with 150 grams fully dry styrene/divinyl benzene copolymer beads (manufactured by Organo Co., Ltd.). The flask was allowed to dry at 90° C. in vacuum for one hour.

Whereupon, the flask was cooled down to room temperature and charged with 22 ml catalyst II. The admixture was reacted at room temperature for one hour, followed by addition of total catalyst I. The resulting admixture was reacted at room temperature with stirring for one hour.

The flask was heated up to 40° C. to provide a slurry. The slurry was dried in vacuum to remove the solvent for 60 minutes, thereby obtaining 198 grams of fluidized solid catalyst.

2. Polymerization

A 3-liter stainless steel autoclave equipped with stirrer was purged with nitrogen and heated to 75° C., followed by addition of 0.3 ml toluene dilute solution of triethyl aluminum (1 mmol/ml) to scavenge the polymerization system. A mixture of ethylene and butene-1 (0.15 butene-1/ethylene mol ratio) was charged to bring a total pressure up to 9 kgf/cm²·G. 110 mg (Zr=0.15 mg) solid catalyst was fed to initiate polymerization. Ethylene/butene-1 gas (0.05 mol ratio butene-1/ethylene) was continuously supplied to continue the reaction under a total pressure maintained at 9 kgf/cm²·G for 2 hours. Upon completion of the reaction, excess gas was removed and the system was cooled to provide 22 grams white polymer.

Catalytic activity: 145 kg/g.Zr
MFR: 1.1 g/10 min.
Mn: 68,200

Comparative Example 11

The procedure of Inventive Example 14 was followed except for the use of 103 mg catalyst (Zr=0.14 mg) (devoid of the catalyst II), thereby obtaining 20 grams white polymer.

Catalytic activity: 146 kg/g.Zr
MFR: 2.2 g/10 min.
Mn: 58,300

INVENTIVE EXAMPLE 15

1. Preparation of Solid Catalyst

The procedure of Inventive Example 11 was followed.

2. Polymerization

A stirrer equipped stainless steel autoclave for vapor phase polymerization was connected with a loop made up of a blower, a flow controller and a dry cyclon and adjusted in temperature at 60° C. with water supplied to its jacket. The autoclave was charged with solid catalyst at a rate of 100 mg/hr and a mixture of butene-1/ethylene at a mol ratio adjusted to be 0.25 in the vapor phase. The polymerization reaction was continued for 10 hours at a total pressure of 8 kgf/cm²·G with the system gases being circulated by the blower, while the resultant polymer was intermittently withdrawn.

Catalytic activity: 86 kg/g.Zr
MFR: 0.48 g/10 min.
Mn: 83,800

Comparative Example 12

The procedure of Inventive Example 15 was followed except that catalyst (II) was not used.

Catalytic activity: 83 kg/g.Zr
MFR: 1.4 g/10 min.
Mn: 65,200

INVENTIVE EXAMPLE 16

Preparation of Solid Catalyst

The procedure of Inventive Example 11 was followed.

Polymerization

A 3-liter stainless steel autoclave equipped with stirrer was purged with nitrogen and charged with one liter refined toluene and 0.3 ml toluene dilute solution of triethyl aluminum (1 mmol/ml) to scavenge the polymerization system. 10 ml toluene dilute solution of the above catalyst (10 mg/ml) were added, followed by a continuous charge of a mixture of ethylene and 1-butene (0.2 1-butene/ethylene mol ratio) up to a total pressure of 9 kgf/cm²·G at 80° C. at which the reaction was continued for 2 hours.

Catalytic activity: 378 kg/g.Zr
MFR: 0.02 g/10 min.
Mn: 111,500

Comparative Example 13

The procedure of Inventive Example 16 was followed except that catalyst (II) was not used.

Catalytic activity: 335 kg/g.Zr
MFR: 0.04 g/10 min.
Mn: 107,200

What is claimed is:

1. A process for the production of polyolefins which comprises polymerizing or copolymerizing olefins in the presence of a catalyst composition which at least comprises:

a catalyst component (I) resulting from mutual contact of sub-components (A) and (B), said sub-component (A) being of the formula

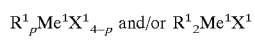

$R^1{}_p Me^1 X^1{}_{4-p}$ and/or $R^1{}_2 Me^1 X^{1'}$ wherein $Me^1$ is a transition metal of the IV Group in the Periodic Table, $R^1$ is a group which is either of cyclopentadienyl, cyclopentadienyl substituted with a moiety selected from the group consisting of $C_1$–$C_{18}$ alkyl, $C_1$–$C_{24}$ alkenyl, aryl, and aralkyl, indenyl, indenyl substituted with a moiety selected from the group consisting of $C_1$–$C_{18}$ alkyl, $C_1$–$C_{24}$ alkenyl, aryl, and aralkyl, fluorenyl and fluorenyl substituted with a moiety selected from the group consisting of $C_1$–$C_{18}$ alkyl, $C_1$–$C_{24}$ alkenyl, aryl, and aralkyl which $R^1$ group may be bonded through a $C_2$–$C_{18}$ hydrocarbon group and/or a silylene group, $X^1$ is a halogen atom, a hydrogen atom or a $C_1$–$C_{24}$ hydrocarbon group, p is an integer of $1 \leq p \leq 4$, and $X^{1'}$ is a $C_1$–$C_{20}$ alkylidene group, and said sub-component (B) being a modified organoaluminum compound having Al—O—Al bonds; and a catalyst component (II) which is an admixture of sub-component (C) and a compound selected from the group consisting of triethylaluminum, triisobutylaluminum, diethylzinc, n-butyllithium, and butylmagnesiumchloride and said sub-component (C) being a transition metal elemental compound belonging to the VII–VIII Groups in the Periodic Table and selected from the group consisting of oxides, halides, carbonates, acetates, alkoxides, acetylacetonates, hydrogen complexes, alkyl complexes, phosphine complexes, cyano complexes, pyridyl complexes and carbonyl complexes of said transition metal elemental compound.

2. A process according to claim 1 wherein said catalyst composition includes an inorganic compound and/or a particulate polymer carrier which is contacted with at least either one of said catalyst components (I) and (II) during or after the preparation of at least either one of said catalyst components (I) and (II).

3. A process according to claim 2 wherein said carrier is contacted with said catalyst component (I) during or after the preparation of the latter, said catalyst component (I) including a sub-component (A) in an amount of 0.0001–5 millimols per grams of said carrier.

4. A process according to claim 2 wherein said carrier is contacted with said catalyst component (II) during or after the preparation of the latter, said catalyst component (II) including a sub-component (C) or (E) in an amount of 0.00005–2.5 millimols per gram of said carrier.

5. A process according to claim 2 wherein said inorganic compound carrier is formed from a material selected from the group consisting of a carbonaceous material, a metal, a metal oxide, a metal chloride, a metal carbonate, and a mixture thereof.

6. A process according to claim 2 wherein said particulate polymer carrier is formed from a polymer selected from the group consisting of ethylene polymers, ethylene alpha-olefin copolymers, propylene polymers and copolymers, poly-1-butene, $C_2$–$C_{12}$ polyolefins, polyester, polyamide, polyvinylchloride, polymethylacrylate, polymethylmethacrylate, polystyrene, polynorbornene, naturally occurring polymers, and mixtures thereof and having an average particle size of 5–2,000 μm.

7. A process according to claim 2 wherein said carrier is pretreated with a compound selected from the group consisting of an organoaluminum compound including trimethylaluminum, triethylaluminum, triisobutylaluminum, tri-n-hexylaluminum, dimethylaluminum chloride, diethylaluminum chloride and diethylmonoethoxyaluminum, an Al—O—Al bond-containing organoaluminum compound or a silane compound.

8. A process according to claim 1 wherein said olefins include alpha-olefins, cyclic olefins, dienes and trienes.

9. A process according to claim 1 which is carried out in an environment under purge of an inert gas at a temperature in the range of from 20° to 200° C., a pressure in the range of from atmospheric to 70 kg/cm$^2$·G and for a time length in the range of from 5 minutes to 20 hours.

* * * * *